United States Patent
Allen et al.

(10) Patent No.: US 7,949,851 B2
(45) Date of Patent: May 24, 2011

(54) TRANSLATION MANAGEMENT OF LOGICAL BLOCK ADDRESSES AND PHYSICAL BLOCK ADDRESSES

(75) Inventors: Walter Allen, Austin, TX (US); Sunil Atri, Austin, TX (US); Robert France, Austin, TX (US)

(73) Assignee: Spansion LLC, Sunnyvale, CA (US)

( * ) Notice: Subject to any disclaimer, the term of this patent is extended or adjusted under 35 U.S.C. 154(b) by 425 days.

(21) Appl. No.: 11/966,919

(22) Filed: Dec. 28, 2007

(65) Prior Publication Data
US 2009/0172345 A1 Jul. 2, 2009

(51) Int. Cl.
*G06F 12/00* (2006.01)
(52) U.S. Cl. .............. 711/203; 711/202; 711/E12.058
(58) Field of Classification Search .................. None
See application file for complete search history.

(56) References Cited

U.S. PATENT DOCUMENTS

| | | | |
|---|---|---|---|
| 2003/0196066 A1* | 10/2003 | Mathews | 711/207 |
| 2007/0050594 A1* | 3/2007 | Augsburg et al. | 711/207 |
| 2008/0098195 A1* | 4/2008 | Cheon et al. | 711/202 |
| 2008/0198651 A1* | 8/2008 | Kim | 365/185.03 |

* cited by examiner

*Primary Examiner* — Reginald G Bragdon
*Assistant Examiner* — Baboucarr Faal
(74) *Attorney, Agent, or Firm* — Turocy & Watson, LLP

(57) ABSTRACT

Systems and/or methods that facilitate PBA and LBA translations associated with a memory component(s) are presented. A memory controller component facilitates determining which memory component, erase block, page, and data block contains a PBA in which a desired LBA and/or associated data is stored. The memory controller component facilitates control of performance of calculation functions, table look-up functions, and/or search functions to locate the desired LBA. The memory controller component generates a configuration sequence based in part on predefined optimization criteria to facilitate optimized performance of translations. The memory controller component and/or associated memory component(s) can be configured so that the translation attributes are determined in a desired order using the desired translation function(s) to determine a respective translation attribute based in part on the predefined optimization criteria. The LBA to PBA translations can be performed in parallel by memory components.

20 Claims, 13 Drawing Sheets

TRANSLATION MANAGEMENT OF LOGICAL BLOCK ADDRESSES AND PHYSICAL BLOCK ADDRESSES

TECHNICAL FIELD

The subject innovation relates generally to memory systems and in particular to systems and methods that can facilitate logical block address to physical block address translations in a non-volatile memory.

BACKGROUND

A wide variety of memory devices can be used to maintain and store data and instructions for various computers and similar systems. In particular, non-volatile (e.g., flash) memory is a type of electronic memory media that can be rewritten and that can retain content without consumption of power. Unlike dynamic random access memory (DRAM) devices and static random memory (SRAM) devices in which a single byte can be erased, flash memory devices are typically erased in fixed multi-bit blocks or sectors. Flash memory technology can include NOR flash memory and NAND flash memory, for example. NOR flash memory evolved from electrically erasable read only memory (EEPROM) chip technology, in which, unlike flash memory, a single byte can be erased; and NAND flash memory evolved from DRAM technology. Flash memory devices typically are less expensive and denser as compared to many other memory devices, meaning that flash memory devices can store more data per unit area.

Flash memory has become popular, at least in part, because it combines the advantages of the high density and low cost of EPROM with the electrical erasability of EEPROM. Flash memory is nonvolatile; it can be rewritten and can hold its content without power. The physical structure is more robust against shock than volatile memory and has gained popularity in portable devices. It can be used in many portable electronic products, such as cell phones, portable computers, voice recorders, thumbnail drives and the like, as well as in many larger electronic systems, such as cars, planes, industrial control systems, etc. The fact that flash memory can be rewritten, as well as its retention of data without a power source, small size, and light weight, have all combined to make memory devices, that utilize in part flash memory, useful and popular means for transporting and maintaining data.

Typically, data can be stored in a physical memory location (e.g., physical block address (PBA)) in a memory device (which can be among a plurality of memory devices in a system). A logical block address (LBA) can be associated with the data and its corresponding PBA to facilitate retrieval of the data from the memory by a host. When the host requests data from or desires to write data to a particular LBA, the PBA in the appropriate memory device can be accessed through a translation of the provided LBA. This translation conventionally can be in the form of an address translation table or translation lookaside buffer (e.g., cache dedicated to address translations) that can be used to store translations of LBAs and PBAs. The table can be maintained in the host or in the individual memory device.

It can be advantageous to have the LBA associated with the data remain the same even while the PBA where the data is stored changes. For example, a block of memory containing the PBA can have antiquated data in other memory locations in the block. The block of memory can be erased to reclaim the block, and valid data stored in the block, including the data in the PBA, can be moved to new physical locations in the memory. Furthermore, as non-volatile memory can have a limited life span (e.g., an upper limit of times the memory can be accessed, read, written or erased), performance and reliability can become concerns with memory systems (e.g., flash memory systems). Techniques have evolved in order to preserve device memory. Conventionally, one technique is known as wear leveling. Data can be physically moved during wear leveling, for example.

In any system involving data storage in non-volatile memory systems, it can be desired to maintain the correspondence of the LBA and the PBA. As data can be relocated physically in a memory device (or in the case of a multi-device system, between memory devices), means to link the LBA and the appropriate corresponding PBA can be undertaken. Any such means can involve a unique combination of a specified number of translation attributes. Determination of these translation attributes can be achieved in part with the information associated with the LBA, which can be in a known location of the non-volatile memory system(s). The attributes can include 1) which device has the LBA and/or associated data (in multi-device systems); 2) which erase block in the device has the LBA and/or associated data, 3) which page in the erase block has the LBA and/or associated data and 4) which data block in the page has the LBA and/or associated data. Techniques such as performing searches of the memory, table look-ups, and/or calculations can be employed to determine the translation attributes to perform a LBA to PBA translation. Conventional determination of PBA (e.g., translation of LBA) can be cumbersome, as each process can entail some limitations, and obtaining all four attributes for a single translation conventionally utilizes the same process.

Each of the conventional translation processes can suffer from limitations. Limitations of table look-ups can generally fall into the category of memory allocation size of the look-up tables. Limitations of calculations can fall into the category of unrestricted data movement. Limitations of searches can fall into the general category of time desired to search the entire data array.

SUMMARY

The following presents a simplified summary of the innovation in order to provide a basic understanding of some aspects described herein. This summary is not an extensive overview of the disclosed subject matter. It is intended to neither identify key or critical elements of the disclosed subject matter nor delineate the scope of the subject innovation. Its sole purpose is to present some concepts of the disclosed subject matter in a simplified form as a prelude to the more detailed description that is presented later.

This subject innovation presents systems/methods that can facilitate improved performance of logical block address (LBA) to physical block address (PBA) translations to facilitate access of a memory (e.g., flash memory). The subject innovation can facilitate improved performance of LBA to PBA translations, as compared to conventional memory devices/systems, in part by employing a translation protocol (e.g., sequence) that can facilitate the selection of a translation function(s) (e.g., calculation function, search function, and/or table look-up function) and/or an order in which translation attributes can be determined, for instance, where the translation protocol can be based in part on a predefined optimization criteria to facilitate a desired (e.g., optimal) performance of LBA to PBA translations. The subject innovation can also provide for updating configuration of a translation protocol to be used via a user interface and/or an automatic re-configuration based in part on a predefined optimization criteria.

In one aspect, a translation function can include a search function, where a search can be performed to locate a marker (e.g., metadata, such as a data pattern, associated with a translation attribute) that can correlate to an LBA associated with the PBA. The search can be performed to locate the marker, where a respective marker at each searched location can be compared to a predefined subset of data (e.g., data pattern) to determine whether the respective marker and predefined subset of data match. If there is a match, the desired marker is located, and the desired translation attribute result associated with the marker can be determined (e.g., location of the memory component, erase block, page, and/or data block, associated with the PBA).

Another translation function that can be performed is a table look-up, where information that can facilitate translation of a LBA to a PBA, and/or facilitate a determination of a translation attribute(s), can be stored in a look-up table(s) (e.g., translation table(s)) that can be referenced to facilitate translation of a LBA to PBA. Employing a table look-up to determine all translation attributes can be inefficient, as in a typical system geometry, the table size utilized to store all the data related to a translation can be two megabytes of random access memory (RAM) or more.

Yet another translation function that can be employed is a calculation function, where one or more calculations can be performed with respect to data and/or metadata associated therewith to facilitate determining a result related to a translation attribute. Concerning the relative efficiency of utilizing calculations in determining the translation attributes, it can be desirable to employ a calculation function in instances where the translation areas are not dynamic or generally not moved with respect to its area. In an example in which the calculation function can be utilized, a system can be constructed such that a LBA divided by the number of devices (e.g., memory components) always has a remainder that can be a constant for that particular LBA. Such translation attribute (e.g., identification and/or location of the memory component) can be determined based in part on the result (e.g., remainder) obtained from performing the calculation function.

In accordance with an aspect, one or more memory components can be employed to facilitate storage of data, where each memory component can comprise one or more memory arrays that each can include a plurality of memory locations (e.g., memory cells) in which data can be stored. A memory component(s) can be associated with a memory controller component that can facilitate LBA to PBA translations. The memory controller component and/or associated components, such as a memory component(s), can be configured based in part on a predefined optimization criteria, so that the translation attribute results can be determined in a desired (e.g., optimal) order (e.g., sequence) and/or by employing a desired translation function(s) that can determine a respective translation attribute result(s) with the desired (e.g., optimal) efficiency in order to perform the LBA to PBA translation to facilitate accessing the desired PBA that can contain the desired LBA and/or data associated therewith. For instance, based in part on the predefined optimization criteria with regard to a particular type of memory component, a desired configuration can comprise performing a calculation function to determine the identification of a memory component, a search function to determine an erase block, a table look-up to determine a page, and a search function to determine a data block, associated with a desired LBA, and the sequence that such translation functions are performed can be in the order listed, because such configured sequence can result in an efficient (e.g., most efficient) LBA to PBA translation.

In accordance with yet another aspect of the disclosed subject matter, multiple memory components can be associated with a memory processor component. In one aspect, individual determination processes associated with LBA to PBA translations can be interleaved and/or performed in parallel to facilitate efficient LBA to PBA translations. For example, commands can be provided to each of the memory components, and each memory component can employ a respective controller component to facilitate determining a result(s) related to a translation attribute(s) based in part on respective command information. Each memory component can perform the translation function associated with the command in parallel (e.g., at the same or substantially the same time) to obtain a respective translation attribute result related to respective LBA to PBA translations. When a translation attribute result is obtained by a particular memory component, such memory component can provide a "ready" signal to the memory controller component indicating that the result is obtained, and the result can be provided to the register component, for example, at a time when the register component is available to communicate with the particular memory component. The features of the disclosed subject matter can facilitate increased operating speed and/or efficiency of memory devices (e.g., memory components and/or memory systems).

To the accomplishment of the foregoing and related ends, certain illustrative aspects are described herein in connection with the following description and the annexed drawings. These aspects are indicative of various ways that can be practiced, all of which are intended to be covered herein. Other advantages and novel features may become apparent from the following detailed description when considered in conjunction with the drawings.

DETAILED DESCRIPTION

Figure 1:
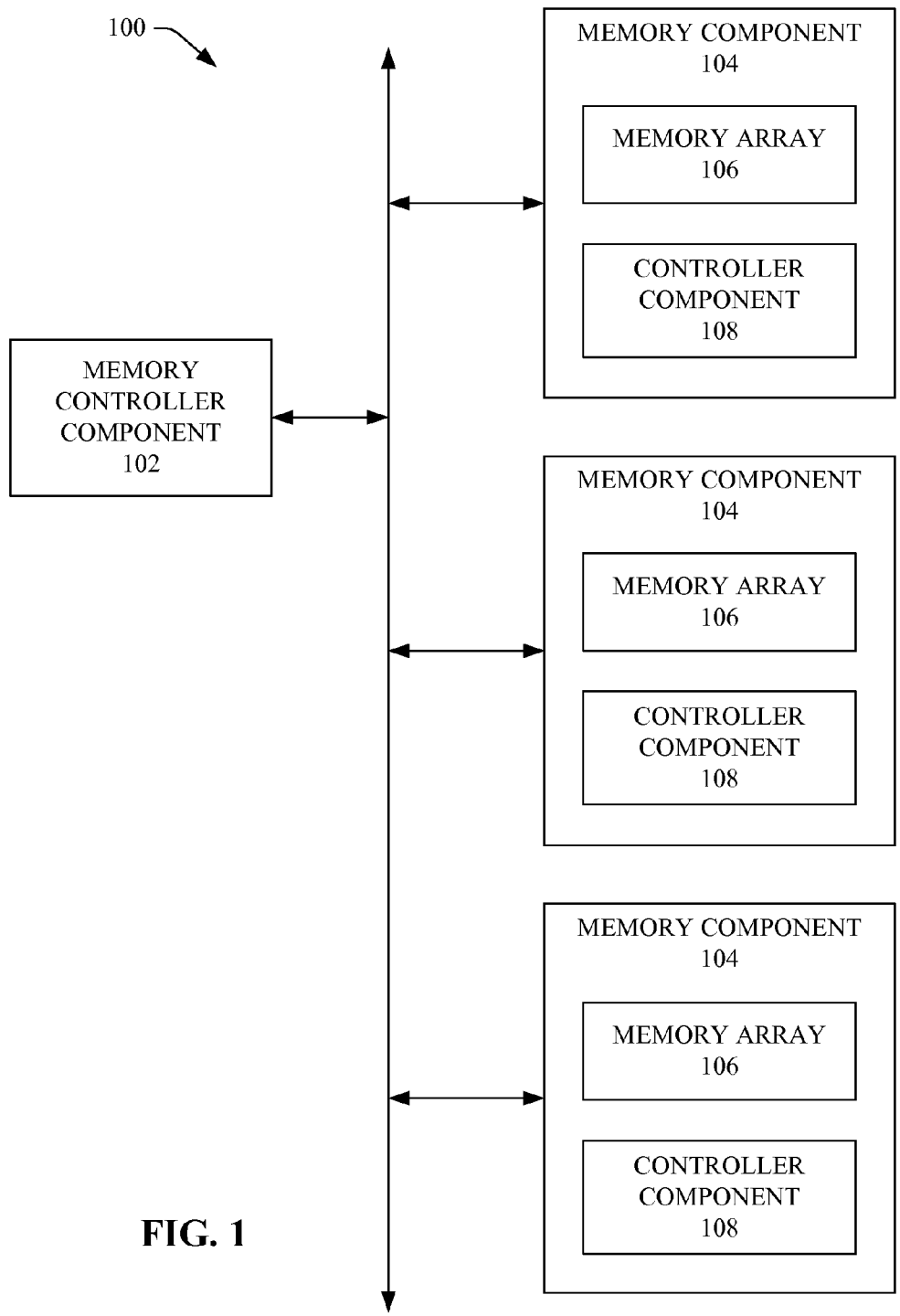
FIG. 1 illustrates a block diagram of a system that can facilitate LBA to PBA translations associated with a memory component(s) in accordance with an aspect of the subject matter disclosed herein.

The disclosed subject matter is described with reference to the drawings, wherein like reference numerals are used to refer to like elements throughout. In the following description, for purposes of explanation, numerous specific details are set forth in order to provide a thorough understanding of the subject innovation. It may be evident, however, that the disclosed subject matter may be practiced without these specific details. In other instances, well-known structures and devices are shown in block diagram form in order to facilitate describing the subject innovation.

Systems and methods that can facilitate improved performance of logical block address (LBA) to physical block address (PBA) translations are presented. In an aspect, a memory controller component can be employed to facilitate performing LBA to PBA translations based in part on a configured sequence. The sequence can be determined based in part on a predefined optimization criteria to facilitate an improved performance of LBA to PBA translations, as compared to conventional systems/devices that perform LBA to PBA translations. The memory controller component can be associated with one or more memory components, where each memory component can facilitate data storage and can comprise a plurality of memory locations. Each physical memory location (e.g., PBA) can be associated with a LBA. The memory controller component and/or the associated memory component(s) can be configured to facilitate performing respective translation functions (e.g., calculation, search, table look-up) to determine results related to respective translation attributes (e.g., identification of memory component, erase block, page, data block, associated with PBA), where a particular translation function can be employed to determine a particular translation attribute because such translation function can do so with desired efficiency, and where the translation attributes can be determined in a desired order to achieve a desired efficiency, with respect to LBA to PBA translations.

Turning to the figures, FIG. 1 illustrates a system 100 that can facilitate translation management associated with a memory in accordance with an aspect of the disclosed subject matter. System 100 can comprise a memory controller component 102 that can facilitate the translation of a LBA to its corresponding PBA. In one aspect, memory controller component 102 can facilitate controlling the performance of various translation functions (e.g., search function, table look-up function, calculation function) that can be employed to facilitate management of the LBAs and PBAs as well as facilitate locating and/or accessing PBAs to locate LBAs respectively associated therewith based in part on information associated with LBAs.

The memory controller component 102 can be associated with one or more memory components 104 (e.g., three memory components 104 are depicted in FIG. 1) that can facilitate the storage of data, code, instructions, etc., where data can be written to, read from, and/or erased from the memory component(s) 104 based in part on commands, instructions, and/or requests to perform a write operation, read operation, and/or erase operation, respectively. Each memory component 104 can comprise nonvolatile memory and/or volatile memory. The nonvolatile memory can include, for example, flash memory (e.g., single-bit flash memory, multi-bit flash memory), mask-programmed ROM, programmable ROM (PROM), Erasable PROM (EPROM), Ultra Violet (UV)-erase EPROM, one-time programmable ROM, electrically erasable PROM (EEPROM, and/or nonvolatile RAM (e.g., ferroelectric RAM (FeRAM)). The volatile memory can include, for example, RAM, static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and/or Rambus dynamic RAM (RDRAM).

Each memory component 104 can include one or more memory arrays 106 (e.g., nonvolatile memory array) that can be composed of various memory schema (e.g., configurations of NOR flash and/or NAND flash) that can receive and store data. A memory array 106 can include a plurality of memory cells (not shown) wherein each memory cell can store one or more bits of data. Data stored in a memory cell(s) in the memory array 106 can also be read and such data can be provided as an output.

Each memory component 104 can also include a controller component 108. The controller component 108 can facilitate control of access to the memory component 104 and data stored therein, data management (e.g., handling internal memory organization) and extended interface commands (e.g., query commands). In one aspect, the controller component also can facilitate the execution of translation functions, such as a search function, a table look-up function, and/or a calculation function to facilitate management of LBAs and PBAs, translation of LBAs to PBAs, and/or locating and/or accessing PBAs to locate and/or retrieve LBAs and/or data associated therewith based in part on LBA information.

In accordance with one aspect, the memory controller component 102 can be configurable such that the performance of various translation functions, can be performed to achieve a desired (e.g., optimal) efficiency, for example, with regard to the order that such functions are performed and/or with respect to the type of function(s) that is/are to be employed to facilitate determining an LBA to PBA translation, or a portion thereof. In accordance with an aspect, the memory controller component 102 can be configured during an initialization, where the initialization (or re-initialization) can be performed to configure the memory controller component 102 based in part on a configuration sequence and the configuration settings can be stored, or each time the memory controller component 102 is powered up an initialization can be performed to configure the memory controller component 102 based in part on a configuration sequence, as desired.

The configuration sequence can be determined based in part on a predefined optimization criteria. The predefined optimization criteria can relate to the type of memory component, the type of memory controller component, the amount of time a particular translation function uses to obtain a result, the amount of power utilized to perform a particular translation function, the amount and/or type of resources (e.g., volatile memory, die area, etc.) utilized to perform a particular translation function, the information desired to perform a translation function, etc.

In accordance with another aspect the memory controller component 102, and/or the controller component 108 of a memory component 104, can facilitate performing various translation functions, such as search functions, table look-up functions, and/or calculation functions, to facilitate determining in which memory component 104 a desired LBA is located (in multi-memory component systems); in which erase block in a memory component 104 a desired LBA is located; in which page in an erase block a desired LBA is located; and/or in which data block in a page a desired LBA is located, to facilitate performing a LBA to PBA translations and/or accessing a desired PBA to locate and/or retrieve an LBA and/or associated data based in part on associated LBA information (e.g., data pattern associated with an LBA).

During initialization, the particular function(s) selected to facilitate determining a particular translation attribute (e.g., memory component identification/location, erase block identification/location, page identification/location, data block identification/location, associated with an LBA) can be determined based in part on a predetermined optimization criteria in order to achieve a desired (e.g., optimal) efficiency in performing LBA-PBA translations and/or locating or retrieving a desired LBA. It is to be appreciated that more than one translation function or process can be employed to facilitate determining a result with regard to a translation attribute. For example, if it is determined that it is desirable to perform a calculation function and a search function to determine in which erase block a desired LBA is located, the memory controller component 102 can be configured to perform a calculation function and a search function to determine which erase block the desired LBA is located. In accordance with an aspect, the controller component 108 and/or the memory controller component 102 can facilitate generating and/or providing an error message if an error occurs during the performance of a translation function or with regard to any other aspect of a LBA to PBA translation.

In accordance with another aspect, the memory controller component 102 can be configurable so as to perform such functions or processes in virtually any desired order based in part on the optimization criteria. For instance, if it is determined that it is desirable (e.g., optimal) to determine a page location before determining the erase block, the memory controller component 102 can be configured so that the determination of the page location can be performed before the determination of the erase block location. In yet another aspect, a result from the performance of a function with regard to one attribute can be utilized as an input to facilitate a determination of another attribute. For example, the result of determining which erase block a desired LBA is located can be utilized as an input to facilitate determining which page in the erase block a desired LBA is located. For example, if the erase block that has been determined to contain the desired LBA contains 64 pages, such information regarding the number of pages in the erase block can be provided as part of the input information that can be utilized to determine which page the desired LBA is located. For instance, a search of an erase block can be limited to 64 searches.

As an example of optimization of the performance of translations, based in part on predefined optimization criteria with respect to particular memory components and a particular memory controller component, a determination can be made that it is more efficient to utilize a calculation function to facilitate determining which memory component a desired LBA is located, as compared to a search function or table look-up function; more efficient to employ a search function to facilitate determining in which an erase block a desired LBA is located, as compared to a calculation function or a table look-up function; more efficient to employ a table look-up function to facilitate determining in which an page a desired LBA is located, as compared to a calculation function or a search function; more efficient to employ a search function to facilitate determining in which data block in a page a desired LBA is located, as compared to a calculation function or a table look-up function; and more efficient to identify the memory component first, the erase block second, the page third, and the data block last, as compared to other sequences. As a result, during initialization, the memory controller component 102 can be configured to perform a calculation function to facilitate determining the memory component, a search function to facilitate determining the erase block, a table look-up function to facilitate determining a page, and a search function to facilitate determining a data block, in which the desired LBA is located to facilitate an LBA-PBA translation and/or access of the desired LBA, and the translation functions can be performed in that desired sequence.

In accordance with still another aspect, when multiple memory components 104 are utilized in system 100, the various functions or processes employed to facilitate LBA to PBA translations and/or access of a desired LBA can be performed in parallel by the memory components 104, where the respective controller components 108 of each memory component 104 can facilitate performing the desired translation functions or processes to facilitate obtaining the desired results (e.g., translation attribute results). For example, if information is received by the memory controller component 102 that a first LBA is located in a first memory component 104, and a second LBA is located in a second memory component 104, and a third LBA is located in a third memory component 104, the memory controller component 102 can send respective instructions and/or commands to each of the memory components 104 at the same or substantially the same time, and each memory component 104 can perform the desired respective translation functions in parallel (e.g., in an interleaved fashion) at the same or substantially the same time to facilitate a translation to locate, access, and/or retrieve each of the desired LBAs in respective memory components 104.

It is to be appreciated that, while the memory controller component 102 is illustrated as a stand-alone component with respect to the memory components 104, the subject innovation is not so limited, as the subject innovation contemplates that, in accordance with various embodiments, at least a portion of the memory controller component can be integrated within a memory component(s) 104 and/or within another component, such as a processor component (not shown), for example, to facilitate an alternative implementation of parallel processing to facilitate determining memory component identification/location, erase block identification/location, page identification/location, and/or data block identification/location to facilitate performing a desired LBA-PBA translation across multiple memory components 104 and/or to facilitate accessing the desired LBAs.

It is to be appreciated that, while three memory components 104 are depicted in FIG. 1, the subject innovation is not limited, as the subject innovation contemplates that there can be less than three memory components 104, three memory components 104, or more than three memory components 104 that can be employed in system 100, as desired.

Turning to FIG. 2, depicted is a system 200 that can facilitate access of a memory in accordance with an aspect of the disclosed subject matter. System 200 can comprise a memory controller component 102 that can include a configuration component 202, which can facilitate configuring the memory controller component 102 and/or components (e.g., memory component 104) associated therewith to facilitate LBA to PBA translations to facilitate accessing memory locations (e.g., memory cells) in a memory component 104 (e.g., as illustrated in FIG. 1 and described herein). In one aspect, the configuration component 202 can receive instructions and/or information that can facilitate configuring the memory controller component 102 and/or associated components. The instructions and/or information can be such that the memory controller component 102 and/or other components can be configured as desired in order to achieve a desired (e.g., optimal) efficiency with regard to performance of LBA to PBA translations. The configuration component 202 can facilitate configuring the desired functions to be performed with respect to each translation attribute (e.g., memory component location/identification, erase block location/identification, page location/identification, and/or data block location/identification) to facilitate LBA to PBA translation. In one aspect, this configuration can be undertaken at the time of component manufacture, when the application in which the component will be used is known, for example. In another aspect, the configuration can be programmed (e.g., configured) at a subsequent time, as desired.

Memory controller component 102 can also comprise an initialization component 204. The initialization component 204 can be utilized to facilitate initializing the configuration of the memory controller component 102 and/or other components associated therewith. In an aspect, the initialization can be performed and the configuration settings can be stored in a storage component 206, where the configuration settings can be retrieved from the storage component 206 and applied each time the memory controller component 102 and associated components are utilized, as desired. In another aspect, the initialization component 204 can initialize to configure the memory controller component 102 and/or associated components each time such components are powered up, as desired. In yet another aspect, the initialization component 204 can be employed to re-initialize to facilitate re-configuring the memory controller component 102 and/or other associated components, as desired.

In another aspect, the initialization component 204 can facilitate initiating a particular translation function (e.g., calculation, search, table look-up) to facilitate a LBA to PBA translation. For instance, the initialization component 204 can facilitate setting an initialization bit for a translation function to facilitate engaging a desired translation function so the desired translation function can be performed, where each translation function can be associated with a respective initialization bit.

Memory controller component 102 can further comprise calculation component 208 that can perform calculation functions and/or processes to facilitate translation of LBA to PBA, and/or access of memory locations in a memory component 104. In one aspect, the calculator component 208 can perform various functions, such as, for example, Add, Subtract, Shift Left, Shift Right, Divide, Multiply, XOR, And, Or, and Inverse, to facilitate obtaining result with regard to a particular attribute that the calculator function 208 is employed to determine. In an aspect, the operand executed can employ a stack so multiple operands can be executed and/or incremented with regard to data. For example, it can be desired to execute a shift left function, and then an 'And' function with regard to data, and the calculator component 208 can perform such functions, as desired. In an aspect, the calculation component 208 can comprise a memory (e.g., volatile or non-volatile) large enough to store all of the operation codes and can auto increment to the next operation code when the previous one has been completed. In an aspect, the calculation component 208 can be utilized in combination with other components to, for example, mask or refine the memory areas desired to be searched, or specify a specific subset of a look-up table to be utilized. For instance, the calculator component 208 can be employed and can provide substantial savings in process time for known specific conditions of changes in PBA. For such applications with known condition changes, the memory controller component 102 can be configured, through configuration component 202, to employ the calculator component 208 to facilitate determining a translation attribute result(s) with regard to a translation attribute(s) related to a LBA to PBA translation.

Memory controller component 102 can also comprise a register component 210. In an aspect, the calculator component 208 and/or other components can work in conjunction with register component 210 to facilitate determining results associated with translation attributes related to a LBA to PBA translation. For example, results, or partial translation attribute results can be stored in register component 210, wherein such translation attribute results can be utilized by other components (e.g., calculator component 208). Also, the register component 210 can receive and store data that can facilitate determining a translation attribute result related to a translation attribute to be determined.

Figure 5:
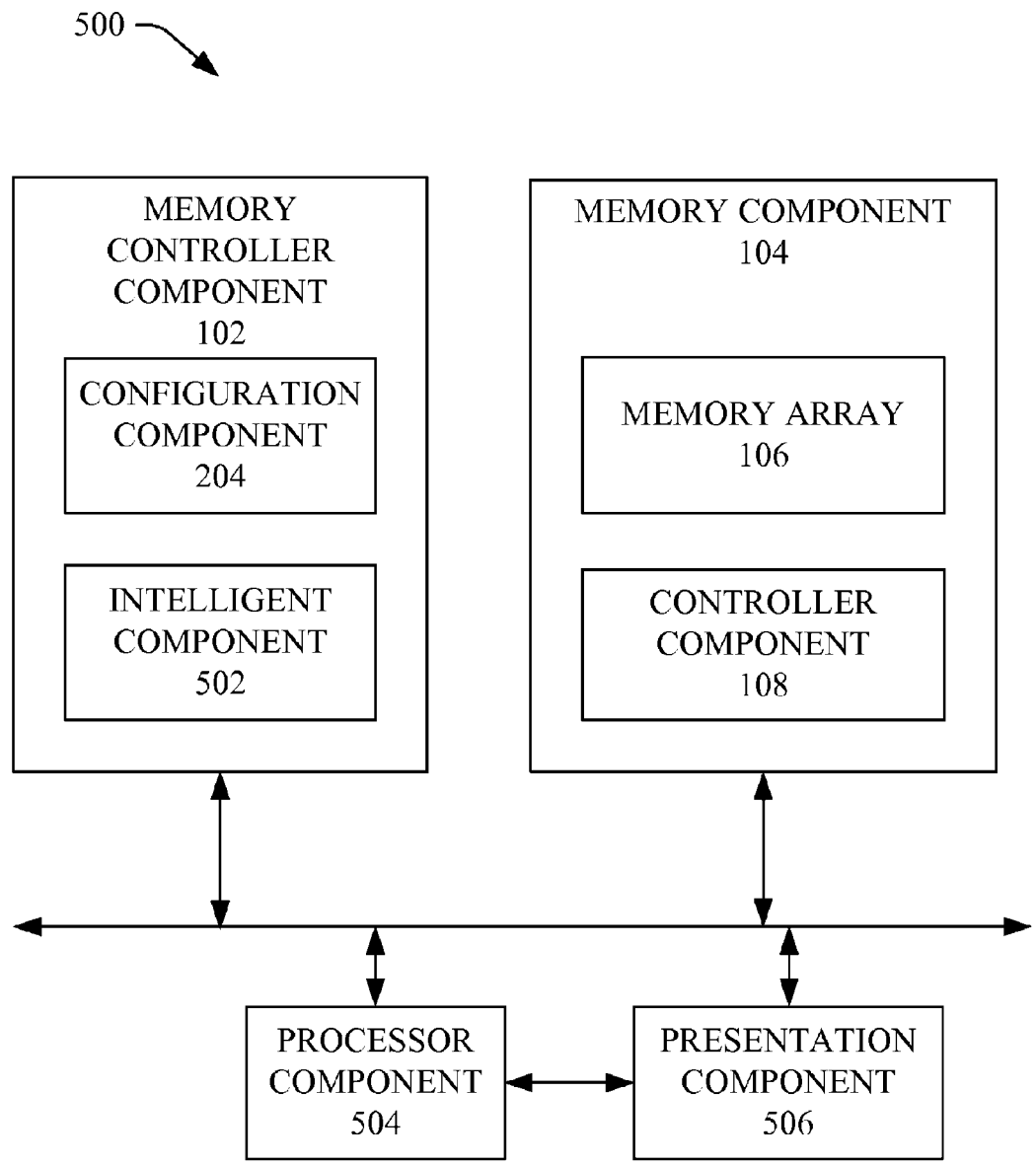
FIG. 5 illustrates a block diagram of a system that can employ intelligence to facilitate LBA to PBA translations associated with a memory component(s) in accordance with an embodiment of the subject matter disclosed herein.

Memory controller component 102 can comprise table look-up component 212 that can facilitate LBA to PBA translation based in part on look-up tables that can contain information related to LBAs and PBAs. In an aspect, the look-up tables can be comprised of subsets of existing tables within the memory component 104 or processor component (e.g., as depicted in FIG. 5 and described herein). The table look-up component 212 can facilitate accessing the look-up tables to retrieve the desired information (e.g., result) based in part on the retrieved data, where the retrieved data can relate to a desired LBA and/or associated PBA(s). The tables employed to store information related to the LBA to PBA translation can be stored within the memory controller component 102 the memory component(s) 104, another component, and/or a stand-alone component, as desired.

In an aspect, memory controller component 102 can facilitate translations to any one or combination of desired translation attributes by employing table look-up component 212 (e.g., alone or in combination with other components). For example, in a specific application, table look-up component 212 can supply a translation attribute result for a base address which can be stored in register component 210 and a result obtained by a calculation component 208 can be stored in register component 210, where the calculator component 208 can sum the base address and the result in the register component 210 to determined the desired memory address.

Memory controller component 102 can further comprise search component 214 that can facilitate determining a translation attribute result(s) (e.g., memory component location/identification, erase block location/identification, page location/identification, and/or data block location/identification) based in part on received information, such as information related to a desired LBA, a desired memory component 104, a block (e.g., block offset, block number), a page (e.g., page offset), a region of data (e.g., data block, page area offset in a page), search up/search down information, search termination information, and/or other information, to facilitate searching for a particular memory component, erase block, page, and/or data block, associated with a desired LBA. In another aspect, the received information can include information (e.g., page area offset) to facilitate retrieval of a portion (e.g., spare area) of a page of data that can contain metadata (e.g., a data pattern) that can be associated with the LBA. The search component 214 can facilitate comparing the metadata to a pattern provided with the received information to determine whether the metadata matches the pattern, where a match can indicate that the desired translation attribute result (e.g., locating a memory component, erase block, page, and/or data block) has been obtained. It is to be appreciated that search component 214 can be employed in conjunction with a controller component 108 within a memory component 104 to facilitate performing searches for the desired translation attribute(s), wherein the search component 214 can facilitate providing the controller component 108 with instructions and/or information desired in order for the controller component 108 to perform the searches. In accordance with one embodiment (not shown), the search component 214 can be integrated within a memory component 104.

Figure 2A:
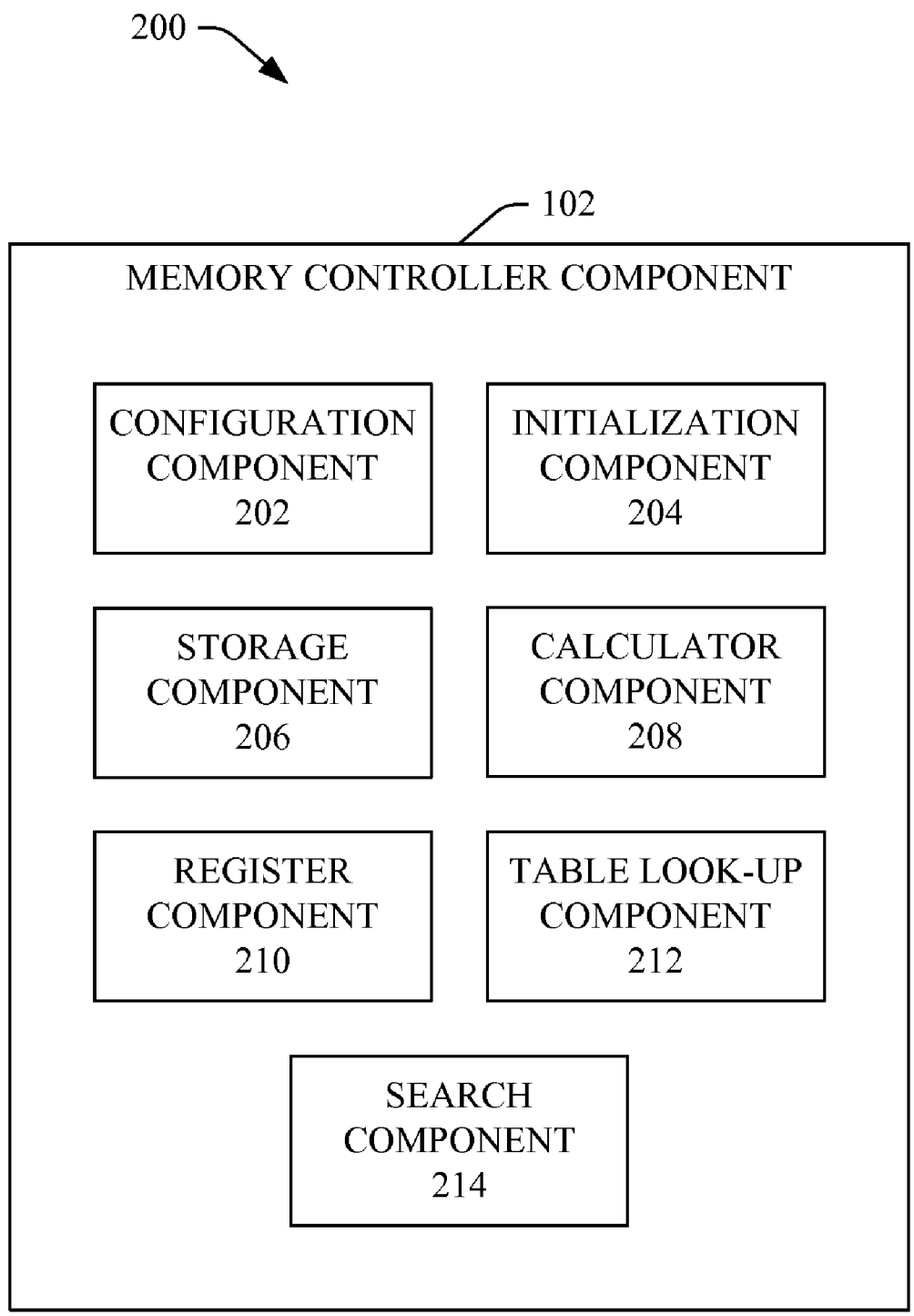
FIG. 2A depicts a block diagram of a system that can employ a memory controller component to facilitate LBA to PBA translations in accordance with an aspect of the disclosed subject matter.
Figure 2B:
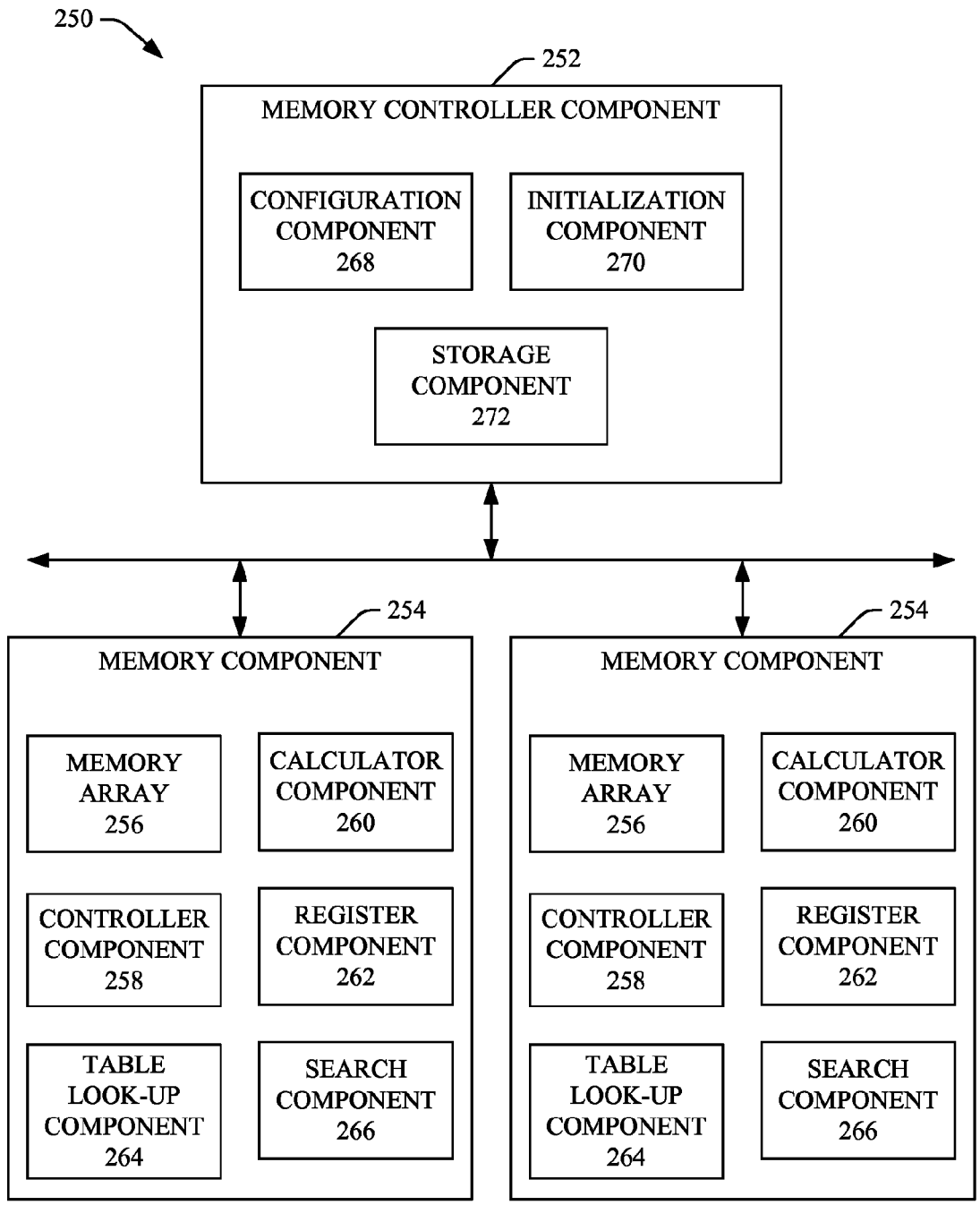
FIG. 2B illustrates a block diagram of a system that can facilitate LBA to PBA translations associated with a memory component(s) in accordance with another embodiment of the subject matter disclosed herein

FIG. 2B illustrates a system 250 that can facilitate translation management associated with a memory in accordance with an embodiment of the disclosed subject matter. System 250 can comprise a memory controller component 252 that can facilitate the translation of a LBA to its corresponding PBA. In one aspect, memory controller component 252 can facilitate controlling the performance of various translation functions (e.g., search function, table look-up function, calculation function) that can be employed to facilitate management of the LBAs and PBAs as well as facilitate locating, accessing, and/or retrieving LBAs and/or associated data based in part on LBA information.

The memory controller component 252 can be associated with one or more memory components 254 (e.g., two memory components 254 are depicted in FIG. 2B) that can facilitate the storage of data, code, instructions, etc., where data can be written to, read from, and/or erased from the memory component(s) 254 based in part on commands, instructions, and/or requests to perform a write operation, read operation, and/or or erase operation, respectively. Each memory component 254 can comprise nonvolatile memory and/or volatile memory. The nonvolatile memory can include, for example, flash memory (e.g., single-bit flash memory, multi-bit flash memory), mask-programmed ROM, programmable ROM (PROM), Erasable PROM (EPROM), Ultra Violet (UV)-erase EPROM, one-time programmable ROM, electrically erasable PROM (EEPROM, and/or nonvolatile RAM (e.g., ferroelectric RAM (FeRAM)). The volatile memory can include, for example, RAM, static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and/or Rambus dynamic RAM (RDRAM). It is to be appreciated that the memory component(s) 254 can comprise the same or similar functionality as memory component 104 as described herein, for example, with regard to system 100.

Each memory component 254 can include one or more memory arrays 256 (e.g., nonvolatile memory array) that can be composed of various memory schema (e.g., configurations of NOR flash and/or NAND flash) that can receive and store data. A memory array 256 can include a plurality of memory cells (not shown) wherein each memory cell can store one or more bits of data. Data stored in a memory cell(s) in the memory array 256 can also be read and such data can be provided as an output.

Each memory component 254 can also include a controller component 258. The controller component 258 can facilitate control of access to the memory component 254 and data stored therein, data management (e.g., handling internal memory organization) and extended interface commands (e.g., query commands). In one aspect, the controller component 258 also can facilitate the execution of translation functions, such as a search function, a table look-up function, and/or a calculation function to facilitate management of LBAs and PBAs, translation of LBAs to PBAs, and/or locating, accessing, and/or retrieving desired LBAs based in part on associated LBA information.

In accordance with one aspect, the memory controller component 252 and/or the memory components 254 can be configurable such that the performance of various translation functions, can be performed to achieve a desired (e.g., optimal) efficiency, for example, with regard to the order that such functions are performed and/or with respect to the type of function(s) that is/are to be employed to facilitate determining an LBA to PBA translation, or a portion thereof. In accordance with an aspect, the memory controller component 252 and/or the memory components 254 can be configured during an initialization, where the initialization (or re-initialization) can be performed to configure the memory controller component 252 and/or memory components 254 based in part on a configuration sequence and the configuration settings can be stored, or each time the memory controller component 252 and the memory components 254 are powered up an initialization can be performed to configure the memory controller component 252 and/or memory components 254 based in part on a configuration sequence, as desired.

The configuration sequence can be determined based in part on a predefined optimization criteria. The predefined optimization criteria can relate to the type of memory component, the type of memory controller component, the amount of time a particular translation function uses to obtain a result, the amount of power utilized to perform a particular translation function, the amount and/or type of resources (e.g., volatile memory, die area, etc.) utilized to perform a particular translation function, the information desired to perform a translation function, etc.

In one aspect, each memory component 254 can contain a calculator component 260 that can facilitate performing calculations to determine one or more translation attributes associated with a LBA to PBA translation associated with such memory component 254. The calculator component 260 can comprise the same or similar functionality as calculator component 208, as illustrated in FIG. 2A and described herein, except that the calculator component 260 can reside within a memory component 254. In one aspect, the controller component 258 can work in conjunction with the calculator component 260 to facilitate performing desired calculations to determine translation attributes and generate translation attribute results.

In accordance with another aspect, each memory component 254 can contain a register component 262 that can facilitate storing and/or manipulating data (e.g., translation attribute results, partial results) associated with a LBA to PBA translation associated with such memory component 254. The register component 262 can comprise the same or similar functionality as register component 210, as illustrated in FIG. 2A and described herein, except that the register component 262 can reside within a memory component 254.

In still another aspect, each memory component 254 can contain a table look-up component 264 that can facilitate performing table-look ups to determine one or more translation attributes associated with a LBA to PBA translation associated with such memory component 254. The table look-up component 264 can comprise the same or similar functionality as table look-up component 212, as illustrated in FIG. 2A and described herein, except that the table look-up component 264 can reside within a memory component 254. In one aspect, the controller component 258 can work in conjunction with the table look-up component 264 to facilitate performing desired table look-ups by accessing and retrieving information associated with LBAs and/or PBAs from a translation table(s) to determine translation attributes and generate translation attribute results.

In yet another aspect, each memory component 254 can contain a search component 266 that can facilitate searching the memory array 256 to determine one or more translation attributes associated with a LBA to PBA translation associated with such memory component 254. The search component 266 can comprise the same or similar functionality as search component 214, as illustrated in FIG. 2A and described herein, except that the search component 266 can reside within a memory component 254. In one aspect, the controller component 258 can work in conjunction with the search component 266 to facilitate searching the memory array 256 to facilitate determining translation attributes and generate translation attribute results.

In accordance with an aspect of the disclosed subject matter, the memory controller component 252 can comprise a configuration component 268 that can facilitate configuring a sequence related to performing LBA to PBA translations associated with the memory components 254. The configuration component 268 can comprise the same or similar functionality as configuration component 202, as illustrated in FIG. 2A and described herein, except that the configuration component 268 can facilitate configuring the sequence to facilitate managing the performance of translation functions by the calculator component 260, table look-up component 262, and/or search component 266 that are situated within a memory component(s) 254.

In another aspect, the memory controller component 252 can contain an initialization component 270 that can be employed to facilitate initializing the configuration of the memory controller component 102 and/or the memory component(s) 254 associated therewith. In an aspect, the initialization can be performed and the configuration settings can be stored in a storage component 272. The configuration sequence settings can be retrieved from the storage component 272 and utilized to facilitate setting the desired parameters for the memory controller component 252 and the memory component(s) 254 (e.g., calculator component 260, register component 262, table look-up component 264, search component 266) to facilitate the performance of LBA to PBA translations such that the desired translation functions can be performed in a desired order based in part on the configuration sequence to optimize the performance of the translations. In another aspect, the initialization component 270 can initialize to configure the memory controller component 252 and/or memory component(s) 254 each time such components are powered up, as desired. In yet another aspect, the initialization component 270 can be employed to re-initialize to facilitate re-configuring the memory controller component 252 and/or memory component(s) 254, as desired.

In another aspect, the initialization component 270 can facilitate initiating a particular translation function (e.g., calculation, search, table look-up) to facilitate a LBA to PBA translation. For instance, the initialization component 270 can facilitate setting an initialization bit for a translation function to facilitate engaging a desired translation function so the desired translation function can be performed, where each translation function can be associated with a respective initialization bit.

In accordance with one embodiment, the memory controller component 252 and the memory components 254 can facilitate performing LBA to PBA translations in parallel (e.g., in an interleaved manner). For instance, a first memory component 254 in conjunction with the memory controller component 252 can facilitate performing a LBA to PBA translation to locate, access, and/or retrieve a LBA contained in such first memory component 254. At the same or substantially the same time, a second LBA to PBA translation can be initiated in a second memory component 254. The second memory component 254 in conjunction with the memory controller component 252 can facilitate performing the LBA to PBA translation to locate, access, and/or retrieve a LBA contained in such second memory component 254, while the first memory component 254 performs its LBA to PBA translation, or portions thereof.

It is to be appreciated that the memory controller component 252 can comprise the same or similar functionality as memory controller component 102 as described herein, for example, with regard to system 100 and/or system 200, except to the extent that certain components, such as the calculator component 260, register component 262, table look-up component 264, search component 266, and their respective functionalities are contained in respective memory components 254. It is to be further appreciated that, while the memory controller component 252 is illustrated as a stand-alone component with respect to the memory components 254, the subject innovation is not so limited, as the subject innovation contemplates that, in accordance with various embodiments, at least a portion of the memory controller component can be integrated within a memory component(s) 254 and/or within another component, such as a processor component (e.g., as illustrated in FIG. 5 and described herein).

It is to be appreciated that, while two memory components 254 are depicted in FIG. 2B, the subject innovation is not limited, as the subject innovation contemplates that there can be less than two memory components 254, two memory components 254, or more than two memory components 254 that can be employed in system 250, as desired.

Figure 3:
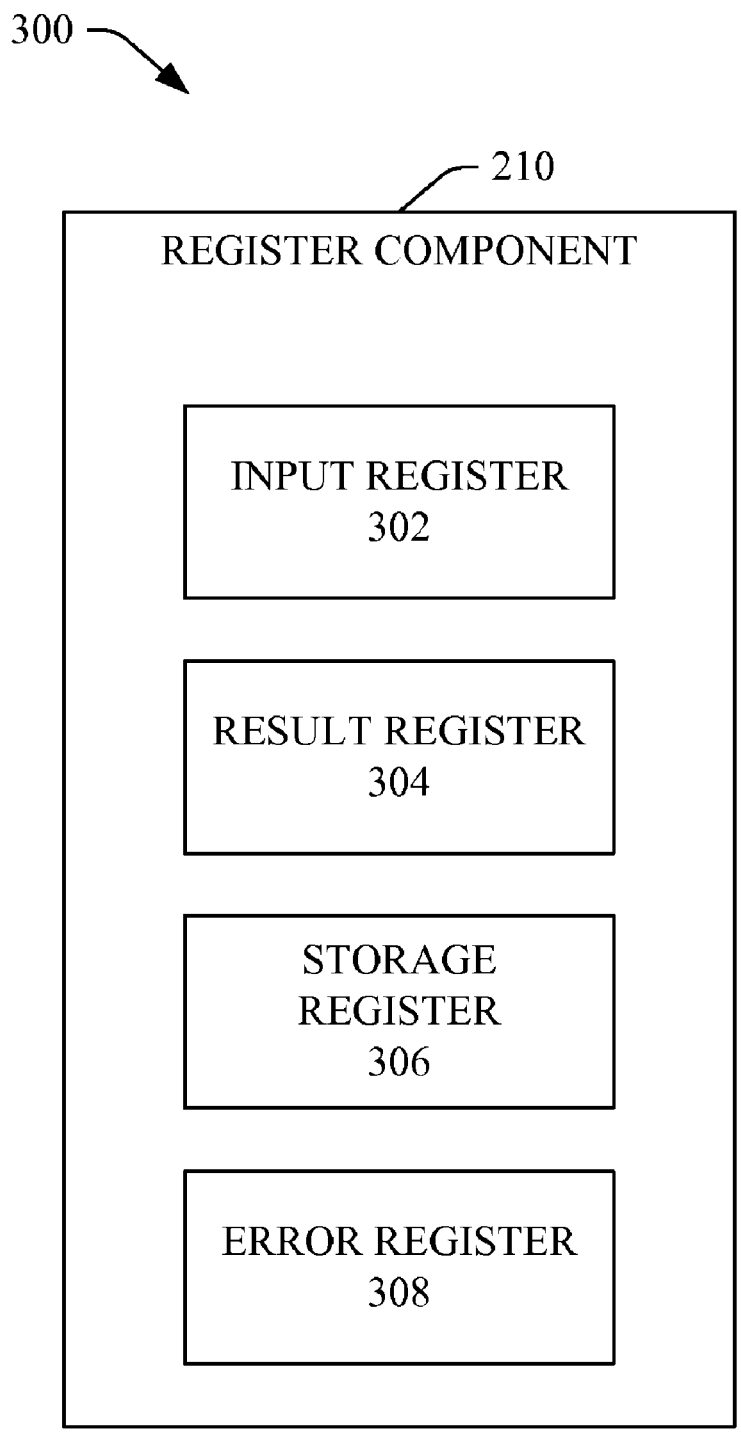
FIG. 3 is a block diagram depicting a system that can employ a register(s) to facilitate LBA to PBA translations in accordance with an aspect of the subject matter disclosed herein.

FIG. 3 depicts a system 300 that can employ registers to facilitate LBA to PBA translation management to facilitate access of a memory in accordance with an aspect of the disclosed subject matter. System 300 can contain a register component 210 that can facilitate management of data related to LBA to PBA translations. Register component 210 can be the same or similar as, and/or can comprise the same or similar functionality as, respective components as more fully described herein, for example, with regard to system 100 and/or system 200.

The register component 210 can contain an input register 302. In an aspect, the input register 302 can receive and store data and/or metadata associated with a given LBA and/or memory component(s) (e.g., number of data blocks per page, number of pages per erase block, number of erase block per device) to facilitate LBA to PBA translations. In another aspect, input register 302 can reference result register 304 in order to utilize a stored result (e.g., from a previous attribute determination) as input to facilitate determining an attribute. In yet another aspect, input register 302 can utilize values dictated by configuration component 202 for specified inputs to calculation component 208.

In one aspect, the result register 304 can receive and store results from attribute determinations, and can facilitate supplying (e.g., transmitting) the results to a processor (e.g., processor component 504, as illustrated in FIG. 5 and described herein) or memory component 104 (e.g., as illustrated in Figure and described herein).

The register component 210 can further comprise a storage register 306. In an aspect, storage register 306 can comprise a memory (e.g., volatile and/or non-volatile) and can temporarily store results (e.g., partial results) and/or other data from other components (e.g., calculator component 208, table look-up component 212, search component 214) until another component (e.g., result register 304) is ready to receive such results and/or other data. In a further aspect, the stored results can serve as references or input information to be input to other components (e.g., calculation component 208, table component 212, search component 214). In one aspect, a register, such as the input register 302, result register 304, or storage register 306, can perform various functions, such as shifting (e.g., shift left, shift right), rotating, masking, to facilitate manipulating data stored in such register, as desired.

Register component 208 can comprise an error register 308 that can store error information that can be generated during a translation determination related to translation attributes when an error occurs. In an aspect, error metadata can be captured. In a further aspect, the error register 308 can provide a suitable response (e.g., error information, error message) to the processor component 504 and/or to a user via presentation component 506 (e.g., as illustrated in FIG. 5 and described herein).

In a non-limiting example, a memory controller component 102 can be configured to operate in a system comprised of a 4 memory components, where each memory component comprises 4 data blocks per page, 64 pages per erase block, and 512 erase blocks per memory component, with a LBA of 32-bit size being used. Based in part on the predefined optimization criteria, the configuration component 202 can be set for the following: performing a calculation function to facilitate identifying the memory component associated with the LBA, performing a calculation function and a table look-up to facilitate identifying the erase block associated with the LBA (e.g., which erase block the LBA is located), performing a search function to facilitate identifying and/or locating a page associated with the desired LBA (e.g., which page the LBA is located), and performing a calculation function to identify and/or locate the data block associated with the LBA (e.g., the data block offset in the page where the LBA is located). Based in part on the predefined optimization criteria, the configuration component 202 can further set the sequence of the performance of the translation functions to be ordered as follows: identification of 1) data block, 2) memory component, 3) erase block, and 4) page.

The calculator component 206 can perform calculations to facilitate determining and/or identifying the desired data block. For instance, the calculator component 208 can calculate the page offset=set-bit (e.g., page offset can facilitate determining location of LBA in a data block), utilizing the register component 210 (e.g., input register 302) to receive input information associated with the LBA, and calculator component 206. The register can be set to 0xffffff00, for example. The calculation can be set to 'And' to facilitate performing an 'And' operation on the data, and the desired calculation can be performed by the calculator component 208. The result can be stored in the result register 304.

Following the configuration sequence, a calculation function can be performed to facilitate identification of the desired memory component associated with the LBA. The input register 302 can receive the information associated with the desired LBA. The calculator component 208 can perform the desired calculation, which can be an 'And' operation, on the data, which can produce a result of 0xffff00ff. The calculator component 208 also can perform a 'Shift Right' function to shift the bits of the result two places to the right, so the result can be in a desired order (e.g., the least significant bit (LSB) of the result is shifted so that the LSB of the result is in the LSB position in the register). The result can be stored in the result register 304 with the other partial results.

The calculator component 208 and table look-up component 212 can be employed to facilitate determining the location of the erase block associated with the LBA. The input register 302 can receive input information associated with the LBA. The calculator component 208 can perform a 'Shift Left' function to move the bits of data in the register 302, as desired. The operand can be set to 4 with respect to the table look-up process, and the table look-up component 212 can access the desired table to retrieve the desired information regarding the erase block based in part on the operand information. For instance, the result for the erase block can be the table base address value+result register value, and such result related to the erase block can be stored in the result register 304.

The search component 214 can be employed to search for the desired page number. Based in part on the configuration sequence, the memory controller component 102 and/or controller component 108 can facilitate narrowing the search by utilizing the partial results already obtained. For instance, the results associated with the identifying the memory component and erase block can be utilized to facilitate narrowing the search, as it can be known that there are 64 pages per erase block in the memory component in which the desired LBA is located. Thus, the search can be narrowed by specifying that a maximum of 64 searches can be performed to locate the desired page. The search can be performed, and the results of the search can be stored in the result register 304. The final result can be all of the respective partial results associated with the data block, memory component, erase block, and page. The final result can be the LBA to PBA translation and can be utilized to access the PBA that contains the desired LBA and the desired operations can be performed on the LBA.

Figure 4:
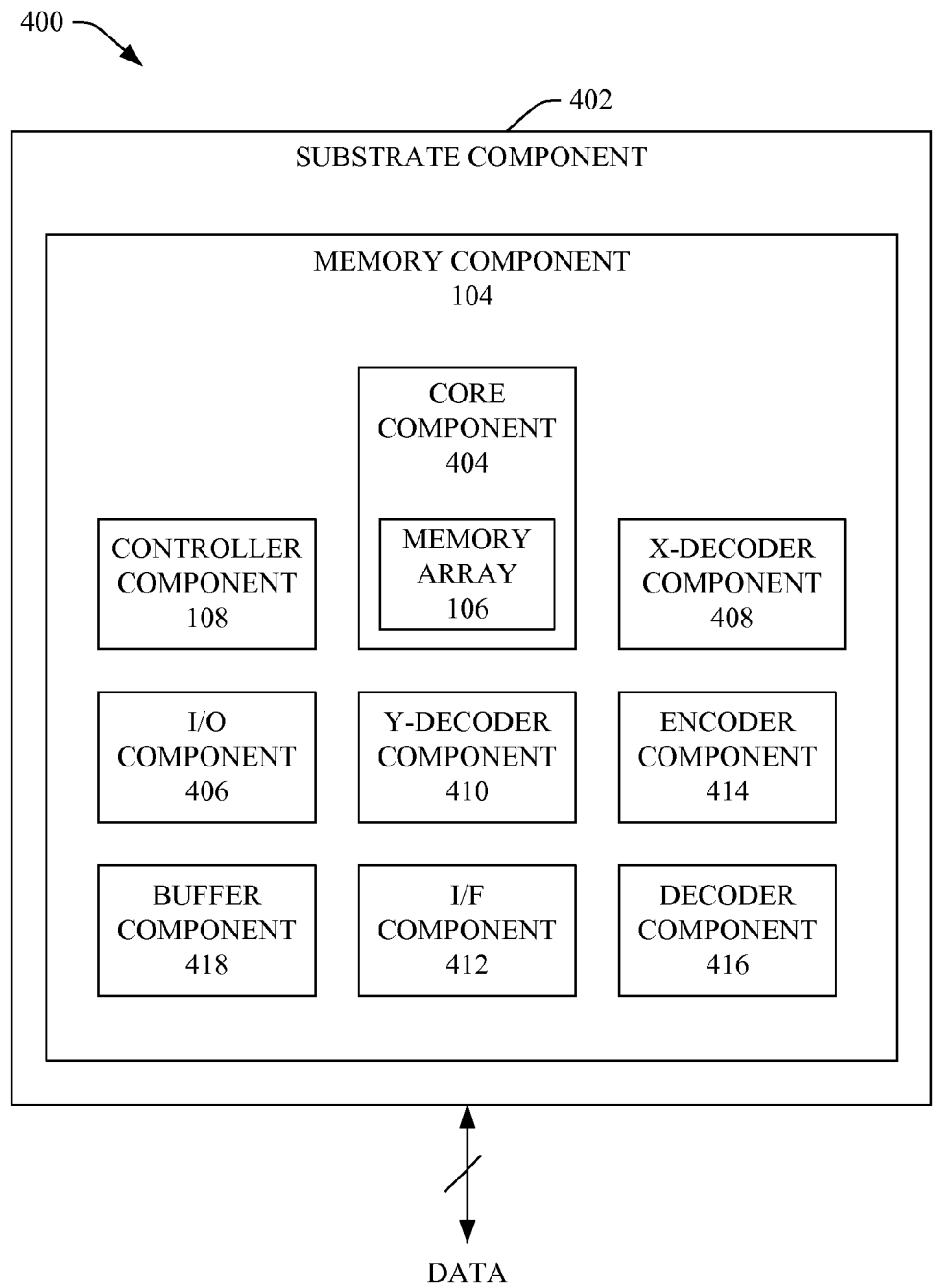
FIG. 4 depicts a block diagram of a memory device in accordance with an embodiment of the disclosed subject matter.

Turning now to FIG. 4, depicted is a block diagram of a memory device 400 that can facilitate storage of data and/or LBA to PBA translations in accordance with an aspect of the disclosed subject matter. Memory device 400 can include a memory component 104 that can comprise a non-volatile memory (e.g., flash memory) and/or volatile memory (e.g., static random access memory (SRAM)). The memory component 104 can receive information, including data, commands, and/or other information, which the memory component 104 can process (e.g., store data, execute commands, etc.). The memory component 104 can include a memory array(s) 106 that can contain a plurality of memory cells, where each memory cell can store one or more bits of data. The memory component 104 can further include a controller component 108 that can execute instructions, commands, etc., to facilitate controlling the flow of data to/from the memory component 104. The memory component 102, memory array(s) 106, and controller component 108 each can be the same or similar as, and/or each can contain the same or similar functionality as, respective components more fully described herein, for example, with regard to system 100, system 200, and/or system 300.

In one aspect, the memory component 104, including the memory array(s) 106, controller component 108, and other components described herein, for example, with regard to memory device 400 can be formed and/or contained on a substrate 402 (e.g., semiconductor substrate). In another aspect, one or more core components 404 (e.g., high-density core regions) and one or more lower-density peripheral regions can be formed on the substrate 402. The core component(s) 404 typically can include one or more M by N arrays (e.g., memory array 106) of individually addressable, substantially identical multi-bit memory cells (not shown). The lower-density peripheral regions can typically include an input/output component 406 (e.g., input/output (I/O) circuitry) and programming circuitry for selectively addressing the individual memory cells. The programming circuitry can be represented in part by and can include one or more x-decoder components 408 and one or more y-decoder components 410 that can cooperate with the I/O component 406 for selectively connecting a source (not shown), gate (not shown), and/or drain (not shown) of selected addressed memory cells to predetermined voltages or impedances to effect designated operations (e.g., programming, reading, verifying, erasing) on the respective memory cells, and deriving necessary voltages to effect such operations. For example, an x-decoder component 408 and a y-decoder component 410 can each receive address bus information, which can be provided as part of a command, and such information can be utilized to facilitate determining the desired memory cell(s) in the memory component 104.

The memory component 104 can receive information (e.g., data, commands, etc.) via an interface component 412 (also referred to herein as "I/F 412"), which can also be formed on substrate 402. I/F 412 can include and/or provide various adapters, connectors, channels, communication paths, etc. to integrate the memory component 104 into virtually any operating and/or database system(s) and/or with one another system(s). In addition, I/F 412 can provide various adapters, connectors, channels, communication paths, etc., that can provide for interaction and/or communication with a processor component (e.g., as depicted in FIG. 5 and described herein), and/or any other component, data, and the like, associated with the memory device 400.

The memory component 104 can also contain an encoder component 414 that can facilitate encoding data being programmed to the memory component 104, where the encoder component 414 also can be formed on the substrate 402. For example, the encoder component 414 can facilitate converting a digital signal to an analog signal (e.g., current level) to facilitate programming data in the memory locations (e.g., memory cells) in the memory component 104.

The memory component 104 can further include a decoder component 416 that can facilitate decoding data being read from the memory component 104. The decoder component 416 can receive an analog signal associated with data, where the analog signal can be stored in the memory location in the memory array 106, and can facilitate converting the analog signal to a digital signal, so that such digital signal representing the read data can be provided to another component (e.g., processor component) for further processing.

In still another aspect, a buffer component 418 can be formed on the substrate 402. The buffer component 418 can comprise volatile (e.g., SRAM) and/or nonvolatile memory to facilitate storage of data, for example, to temporarily store data being written to and/or read from the memory array 106, and/or other data associated with the memory component 104 (e.g., translation attribute information).

Referring to FIG. 5, system 500 that can employ intelligence to facilitate translation management associated with a memory in accordance with an aspect of the disclosed subject matter. System 500 can comprise a memory controller component 102 that can facilitate the translation of a LBA to its corresponding PBA. System 500 can comprise one or more memory components 104 that can facilitate data storage (it is to be appreciated that only one memory component 104 is illustrated in FIG. 5 for brevity and clarity). Memory controller component 102 and memory component 104 can be the same or similar as, and/or can comprise the same or similar functionality as, respective components as more fully described herein, for example, with regard to system 100, system 200, system 300, and/or memory device 400.

In one embodiment, the memory controller component 102 can include an intelligent component 502 that can be employed to facilitate determining LBA to PBA translations. Intelligent component 502 can be employed in connection with assignments with extrinsic information (e.g., environmental factors, preferences, historical information). In accordance with an aspect, the intelligent component 502 can employ artificial intelligence techniques to facilitate automatically performing various aspects (e.g., analyzing resources, extrinsic information, preferences) as described herein. Moreover, intelligence-based schemes can be employed to facilitate inferring intended actions to be performed at a given time and state. The intelligence-based aspects of the subject innovation can be affected via any suitable machine learning based technique and/or statistical-based techniques and/or probabilistic-based techniques. For example, the use of expert systems, fuzzy logic, support vector machines (SVMs), Hidden Markov Models (HMMs), greedy search algorithms, rule-based systems, Bayesian models (e.g., Bayesian networks), neural networks, other non-linear training techniques, data fusion, utility-based analytical systems, systems employing Bayesian models, etc. are contemplated.

In accordance with one aspect, intelligent component 502 can work in conjunction with configuration component 202 and/or initialization component 204 (e.g., as illustrated in FIG. 2 and described herein) to reconfigure the translation settings to facilitate desired (e.g., optimal) performance of functions in order to facilitate determining the desired translation attributes related to a LBA to PBA translation. For example, the intelligent component 502 can evaluate current and/or historical information regarding the performance of the memory controller component 102 with regard to performing LBA to PBA translations and, based in part on such information, can determine (e.g., render an inference) that the memory controller component 102 and/or associated components (e.g., memory component 104) can achieve better performance with regard to translations if the memory controller component 102 and/or associated components are reconfigured (e.g., functions, such as search, calculation, and/or table look-up, can be performed in a different order as compared to current configuration; a different function(s) can be utilized to obtain attribute result, as compared to current configuration). Such determination can be communicated to the initialization component 204 and/or configuration component 202, where a re-configuration can be initialized and performed to reconfigure the memory controller component 102 and/or other components in accordance with the determination rendered by the intelligent component 502.

System 500 can also include a processor component 504 that can be associated with memory controller component 102 and the memory component 104, for example, via a bus (e.g., multi-bit bus). In accordance with an embodiment of the disclosed subject matter, the processor component 504 can be a typical applications processor that can manage communications and run applications. For example, the processor component 504 can be a processor that can be utilized by a computer, a mobile handset, personal data assistant (PDA), or other electronic device. The processor component 504 can generate commands, including read, write, and/or erase commands, in order to facilitate reading data from, writing data to, and/or erasing data from the memory component(s) 104. It is also to be appreciated that processor component 504 can be configured to send/receive information directly to memory component(s) 104 and/or memory controller component 102, for example.

System 500 also can include a presentation component 506, which can be associated with the processor component 504 and/or other components of system 500. The presentation component 506 can provide various types of user interfaces to facilitate interaction between a user and any component coupled to the processor component 504. As depicted, the presentation component 506 can be a separate entity that can be utilized with the processor component 504 and associated components. However, it is to be appreciated that the presentation component 506 and/or similar view components can be incorporated into the processor component 504 and/or a stand-alone unit. In one aspect, the presentation component 506 can provide one or more graphical user interfaces (GUIs), command line interfaces, and the like. For example, a GUI can be rendered that provides a user with a region or means to load, import, read, etc., data, and can include a region to present the results of such. These regions can comprise known text and/or graphic regions comprising dialogue boxes, static controls, drop-down-menus, list boxes, pop-up menus, as edit controls, combo boxes, radio buttons, check boxes, push buttons, and graphic boxes. In addition, utilities to facilitate the presentation such as vertical and/or horizontal scroll bars for navigation and toolbar buttons to determine whether a region will be viewable can be employed. For example, the user can interact with one or more of the components coupled to and/or incorporated into the processor component 504. The user can also interact with the regions to select and provide information via various devices such as a mouse, a roller ball, a keypad, a keyboard, a pen and/or voice activation, for example. Typically, a mechanism such as a push button or the enter key on the keyboard can be employed to facilitate entering the information in order to initiate the search. However, it is to be appreciated that the claimed subject matter is not so limited. For example, merely highlighting a check box can initiate information conveyance. In another example, a command line interface can be employed. For example, the command line interface can prompt (e.g., via a text message on a display and an audio tone) the user for information via providing a text message. The user can than provide suitable information, such as alpha-numeric input corresponding to an option provided in the interface prompt or an answer to a question posed in the prompt. It is to be appreciated that the command line interface can be employed in connection with a GUI and/or API. In addition, the command line interface can be employed in connection with hardware (e.g., video cards) and/or displays (e.g., black and white, and EGA) with limited graphic support, and/or low bandwidth communication channels.

Figure 6:
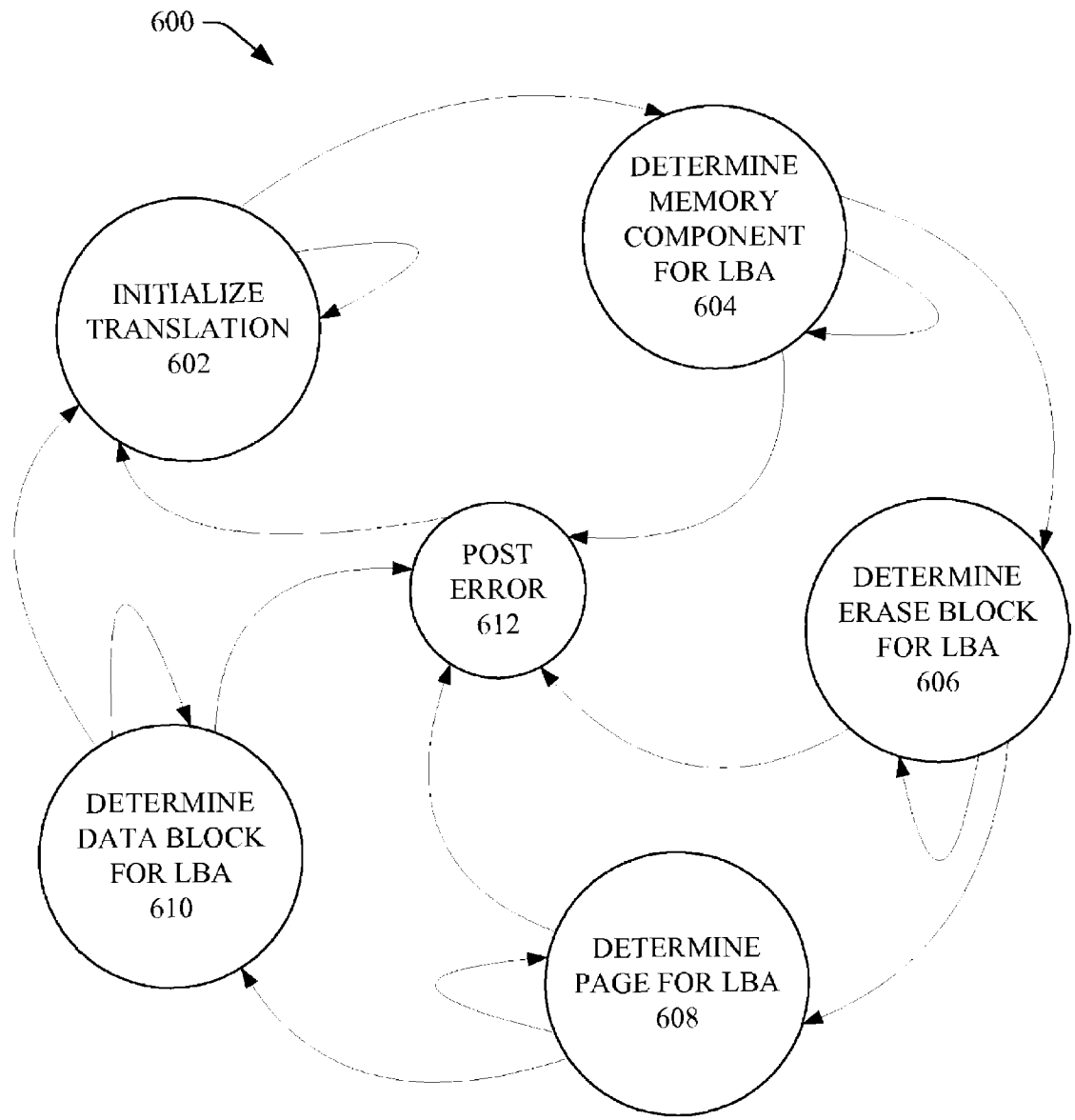
FIG. 6 illustrates an example state diagram of LBA to PBA translations in accordance with an aspect of the subject matter disclosed herein.

Referring to FIG. 6, depicted is an example state diagram 600 related to a LBA to PBA translation in accordance with an aspect of the disclosed subject matter. At state 602, an initial translation state can exist. In an aspect, this state can remain at state 602, or a translation, or portion thereof, can be initiated (e.g., initialization bit being set). In another aspect, the initialization of a translation, or a portion thereof, can be triggered via an initialization component 204.

It is to be appreciated that configuration component 202 has flexibility to initiate states 604, 606, 608 and/or 610 in a multitude of serial and/or parallel manners. The non-limiting state diagram 600 portrays only one such state flow. The innovative aspects disclosed herein are intended to cover all such possible state flows. In the example, transition to state 604 can occur based in part on an initialization bit being set and configuration component 202 can dictate that the first transition be to state 604, for example. At state 604, memory controller component 102 can facilitate performance of a desired function (e.g., calculation, search, and/or table lookup) to determine the specific memory component 104 that contains the desired PBA and associated LBA based in part on the configuration of the memory controller component 102 and/or associated components, or a pass through to another state can occur if the desired result is already determined, for example. State 604 can be maintained, or can transition to Post Error state 612 if an error occurs while processing to identify and/or locate the desired memory component 104 that contains the desired PBA and associated LBA. If the process for determining the memory component 104 (e.g., determining specific device ID) is completed without error, a transition to state 606 can occur.

At state 606, memory controller component 102 can facilitate determining the erase block that contains the desired PBA and associated LBA, where one or more functions can be performed, based in part on the configuration of the memory controller component 102 and/or other components, to facilitate determining the erase block, or a pass through to another state can occur if the desired result is already determined, for example. State 606 can be maintained, or can transition to Post Error state 612 if an error occurs while processing top determine the desired erase block. If the process for determining the desired erase block completes without error, transition to state 608 can occur.

At state 608, memory controller component 102 can facilitate determining a page that can contain a desired PBA and associated LBA, where the determination (e.g., result) can be obtained by employing a desired function based in part on the configuration of the memory controller component and/or associated components, or a pass through to another state can occur if the desired result is already determined, for example. State 608 can be maintained, or can transition to Post Error state 612 if an error occurs while processing to locate the desired page. If the process to locate the desired page completes without error, transition to state 610 can occur.

At state 610, memory controller component 102 can facilitate determining a data block that can contain the desired PBA and associated LBA, or a pass through to another state can occur if the desired result is already determined, for example. The result for the data block can be determined by employing a desired function based in part on the configuration of the memory controller component 102 and/or associated components. State 610 can be maintained, or can transition to Post Error state 612 if an error occurs while processing to determined the desired data block. If the process to determine the desired data block completes without error, a transition to state 602 can occur and the final result of LBA to PBA translation can be provided as all desired attributes have been determined. If state 612 has been entered, an appropriate action based in part on configuration component 202 and/or error register 308 can take place and the state can transition back to 602, for example. In states 604, 606, 608 and 610, upon entering the state, determination of the desire to process the state can occur per the memory controller component 102. In an aspect, each state can contain a pass through value, wherein the particular attribute (e.g., location/identification of a memory component, erase block, page, and/or data block) already can be stored, and it is not desired to be determined, for example.

Figure 7:
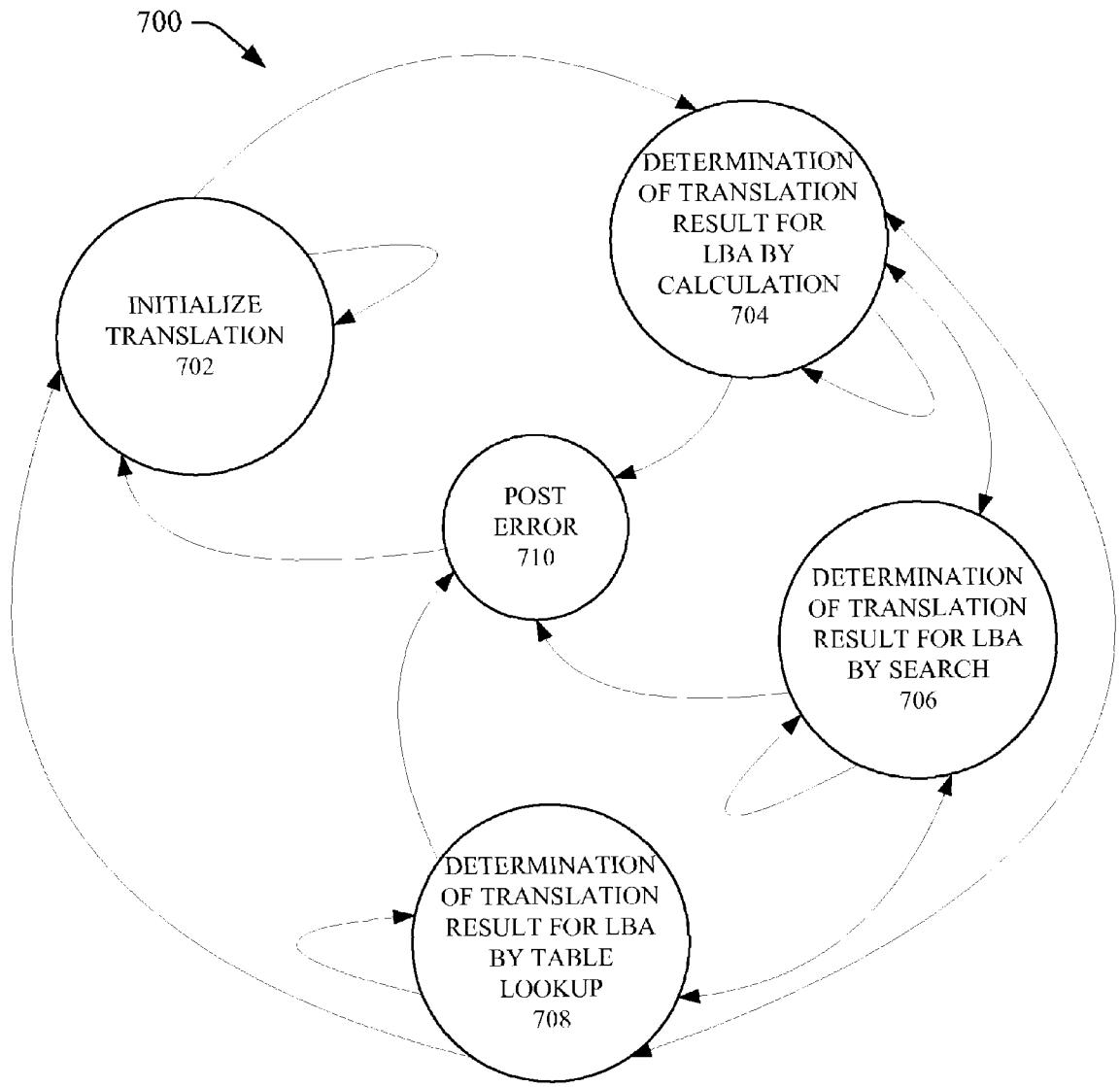
FIG. 7 illustrates another example state diagram of LBA to PBA translations in accordance with an aspect of the subject matter disclosed herein.

Referring to FIG. 7, illustrated is an example state diagram 700 relating to performance of functions to obtain attribute results associated with a LBA to PBA translation in accordance with an aspect of the disclosed subject matter. At state 702, an initial translation state can exist. In an aspect, this state can remain at state 702, or can initiate a translation (e.g., initialization bit can be set). In an aspect, the initialization can be triggered via an initialization component 204.

It is to be appreciated that configuration component 202 has flexibility to initiate states 704, 706, 708 and/or 710 in a multitude of serial and/or parallel manners. The non-limiting diagram 700 portrays only one such state flow. The innovative aspects disclosed herein are intended to cover all such possible state flows. In the example, transition to state 704 can occur based in part on an initialization bit being set, for example. At state 704, memory controller component 102 can facilitate determination of an attribute (e.g., location or identification of a memory component, an erase block, a page, and/or a data block, associated with a desired PBA) associated with a desired PBA and associated LBA by performing a calculation (or a pass through such state can occur if the desired result is already obtained). State 704 can be maintained, or can transition to Post Error state 710 if an error occurs while calculating to determine the desired attribute(s). If the calculation is completed without error, transition to state 706 can occur.

At 706, memory controller component 102 can facilitate determination of an attribute(s) (e.g., translation attribute(s)) associated with a desired PBA and associated LBA by performing a search (or a pass through such state can occur if the desired result is already obtained). State 706 can be maintained, or can transition to post error state 710 if an error occurs while searching. If searching completes (e.g., search result obtained) without error, transition to state 708 can occur.

At state 708, memory controller component 102 can facilitate determination an attribute(s) associated with a desired PBA and associated LBA by performing a look-up to retrieve a result from a look-up table that can contain information related to the LBA to PBA translation (or a pass through such state can occur if the desired result is already obtained). State 708 can be maintained, or can transition to post error state 710 if an error occurs while performing the table look-up. If the table look-up process completes without error, transition to state 702 can occur. In an aspect, the desired translation result has been obtained with one pass through. In another aspect, multiple passes can be made and sequencing of states can be determined by the configuration component 202. It is to be appreciated that any of the states can contain a pass through value, wherein the particular state can be skipped. If state 710 has been entered, an appropriate action based on configuration component 202 and/or error register 308 can take place and the state can transition back to 702.

The aforementioned systems and/or devices have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component providing aggregate functionality. The components may also interact with one or more other components not specifically described herein for the sake of brevity, but known by those of skill in the art.

FIGS. 8-13 illustrate methodologies and/or flow diagrams in accordance with the disclosed subject matter. For simplicity of explanation, the methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts may be desired to implement the methodologies in accordance with the disclosed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Figure 8:
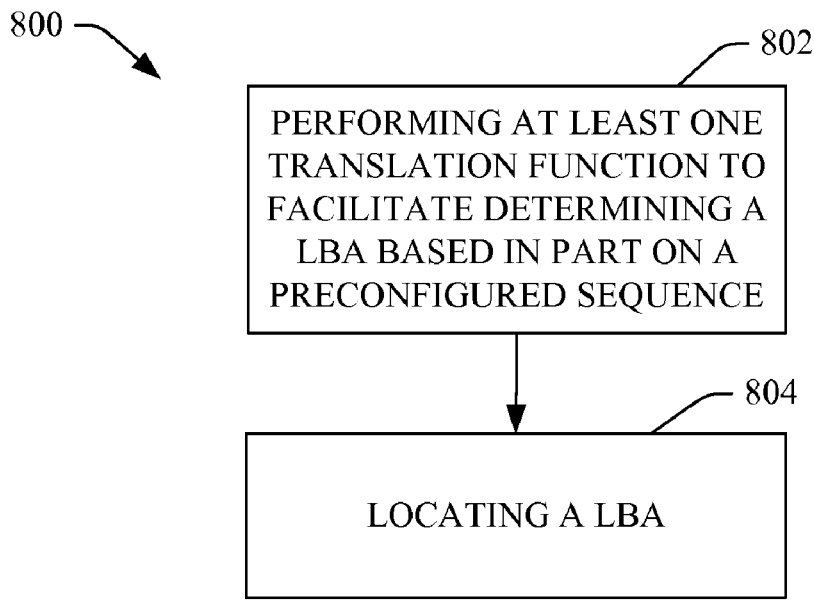
FIG. 8 depicts a methodology that can facilitate LBA to PBA translations in accordance with an aspect of the disclosed subject matter.

Referring to FIG. 8, a methodology 800 that can facilitate determining LBA to PBA translations associated with a memory(ies) in accordance with an aspect of the disclosed subject matter is illustrated. At 802, one or more translation functions can be performed to facilitate determining a location of a LBA associated with a PBA based in part on a preconfigured sequence. In an aspect, a memory controller component 102 and/or associated components (e.g., memory component 104) can be configured to facilitate performing LBA to PBA translations. Configuration component 202 can be configured so that, during a LBA to PBA translation to locate and/or access a desired PBA(s) that can contain a desired LBA to locate and/or retrieve the desired LBA and/or associated data, the translation functions can be performed in a desired order and/or a desired translation function(s) can be employed to obtain a result(s) for respective attributes such that a desired (e.g., optimal) performance of a LBA to PBA translation is achieved.

At 804, a LBA can be located. In an aspect, the memory controller component 102 and/or associated components can facilitate locating and/or accessing the desired PBA(s) that contains the LBA and/or data associated therewith by performing desired translation functions to determine desired attributes related to the desired PBA(s) to facilitate a LBA to PBA translation to facilitate locating and/or accessing the desired PBA(s) that can contain an associated LBA(s) and/or data associated therewith. In one aspect, the memory location (s) (e.g., PBA(s)) can be located and/or accessed to facilitate reading data from, writing data to, and/or erasing data from such memory location(s), for example. At this point, methodology 800 can end.

Figure 9:
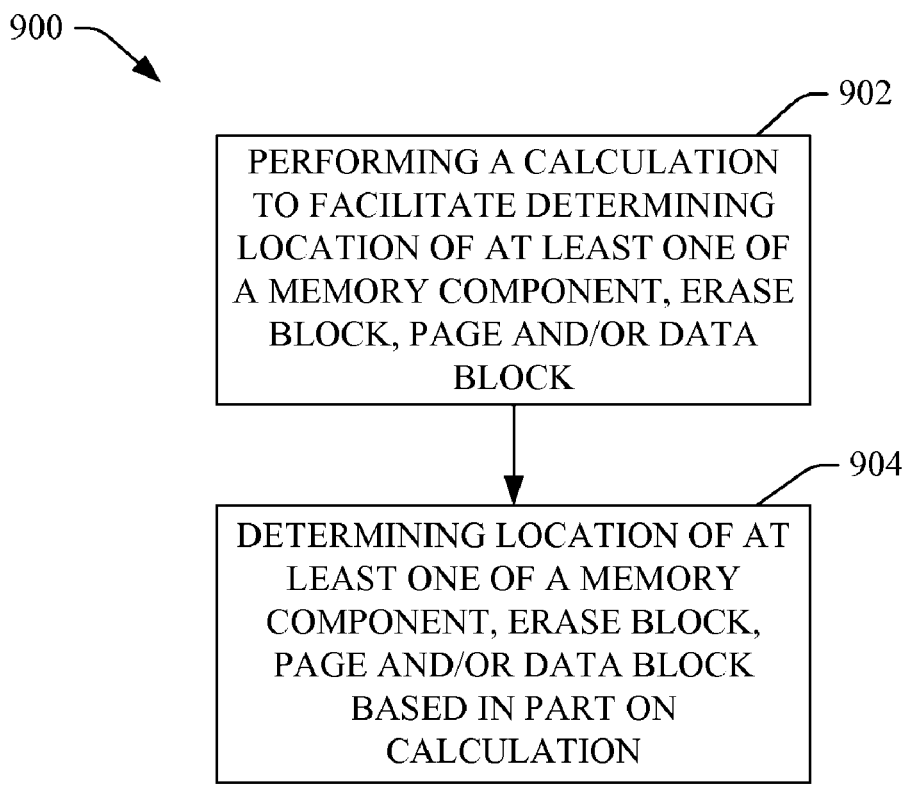
FIG. 9 illustrates a methodology that can facilitate performing calculations to facilitate LBA to PBA translations in accordance with an aspect of the disclosed subject matter.

Now referring to FIG. 9, illustrated is a methodology 900 that can perform calculations to facilitate determining LBA to PBA translations associated with a memory(ies) in accordance with an aspect of the disclosed subject matter. At 902, a calculation(s) can be performed to facilitate determining an identification and/or location of a memory component (e.g., 104), an erase block, a page, and/or a data block associated with a LBA(s) and/or PBA(s) associated therewith. In an aspect, a memory controller component 102 can be configured to perform a calculation(s) to facilitate determining the desired attribute(s). For instance, the memory controller component can employ a calculator component that can facilitate performing one or more calculations to determine the translation attribute result(s). In another aspect, the methodology 900 can be combined serially or in parallel with other methodologies (e.g., methodology comprising performing a table look-up to determine a translation attribute result; methodology comprising performing a search to determine a translation attribute result).

At 904, an identification and/or a location of a memory component, an erase block, a page, and/or a data block associated with a LBA (e.g., translation attribute result(s)) can be determined based in part on the performed calculation(s). In one aspect, the translation attribute result can place the result in a result register 304, and either serially, or in parallel determinations of the other attributes can be processed. At this point, methodology 900 can end.

Figure 10:
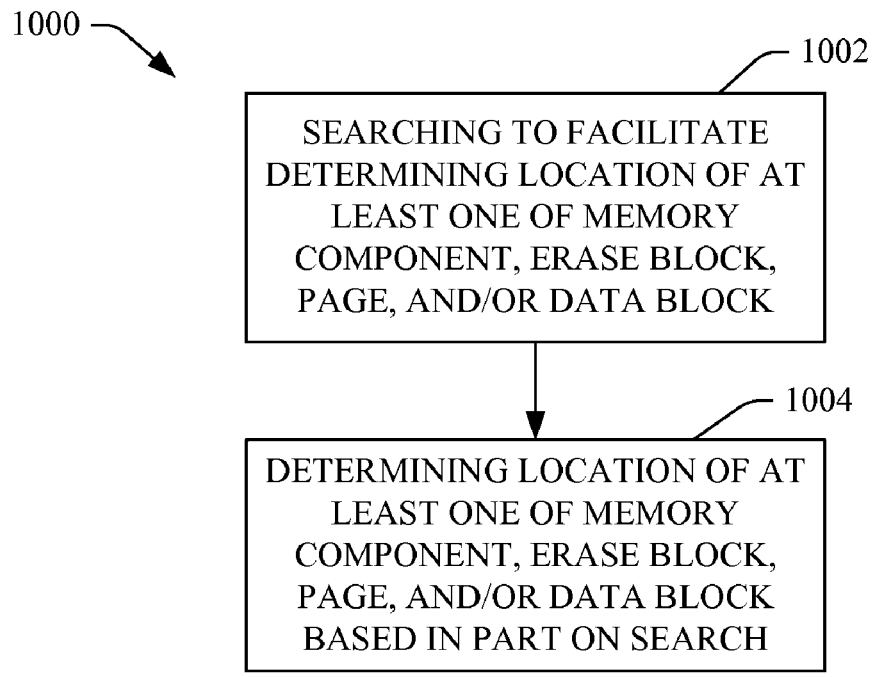
FIG. 10 illustrates a methodology that can facilitate performing searches to facilitate LBA to PBA translations in accordance with an aspect of the disclosed subject matter.

Turning now to FIG. 10, illustrated is a methodology 1000 that can perform searches to facilitate determining LBA to PBA translations associated with a memory(ies) in accordance with an aspect of the disclosed subject matter. At 1002, one or more searches can be performed to facilitate determining an identification and/or location of a memory component (e.g., 104), an erase block, a page, and/or a data block associated with a desired LBA(s) and/or associated PBA(s). In an aspect, a memory controller component 102 can be configured to perform searches related to LBAs and/or other information in a memory component(s) (e.g., 104) to facilitate determining a result to a desired translation attribute(s). For instance, the memory controller component can utilize a search component (e.g., 214) that can work in conjunction with a respective controller component(s) (e.g., 108) in a respective memory component(s) to facilitate performing searches to obtain the desired translation attribute result(s). In another aspect, the methodology 1000 can be combined serially or in parallel with other methodologies (e.g., methodology comprising performing a table look-up to determine a translation attribute result; methodology comprising performing a calculation(s) to determine a translation attribute result).

At 1004, the identification and/or location of the memory component, erase block, page, and/or data block associated with the desired LBA can be determined based in part on the search(es). In an aspect, the determination can place the translation attribute result in a result register 304. When all desired translation attribute results are obtained, such results can be provided to the processor component, which can generate commands to facilitate accessing the desired memory location(s) in the identified memory component. At this point, methodology 1000 can end.

Figure 11:
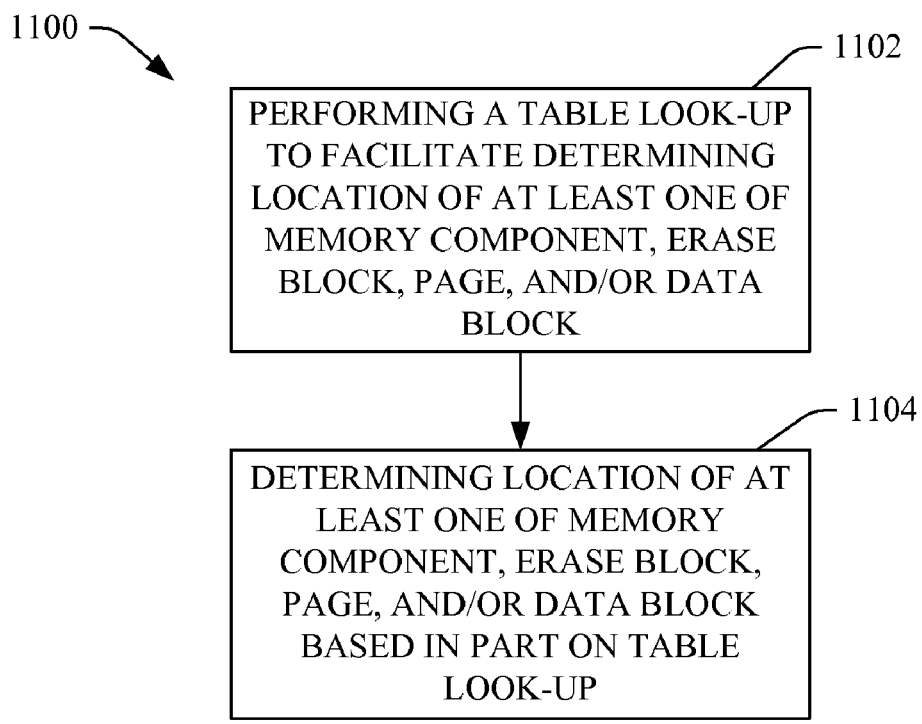
FIG. 11 illustrates a methodology that can perform table look-ups to facilitate LBA to PBA translations in accordance with an aspect of the disclosed subject matter.

FIG. 11 illustrates a methodology 1100 for performing table look-ups to facilitate determining a LBA to PBA translation associated with a memory(ies) in accordance with an aspect of the disclosed subject matter. At 1102, a table lookup can be performed to facilitate determining an identification and/or location of a memory component (e.g., 104), an erase block, a page, and/or a data block associated with a LBA(s). In an aspect, a memory controller component 102 can be configured to perform table look-ups related to LBAs and/or other information to facilitate determining a result to a desired translation attribute(s). For instance, the memory controller component and/or controller component (e.g., 108) of a respective memory component can employ a table look-up component (e.g., 212) to facilitate performing table look-ups to obtain the desired translation attribute result(s). The translation tables can be contained within a memory component, memory controller component, another component, and/or a stand-alone component. In another aspect, the methodology 1100 can be combined serially or in parallel with other methodologies (e.g., methodology comprising performing a search(es) to determine a translation attribute result; methodology comprising performing a calculation(s) to determine a translation attribute result).

Figure 12:
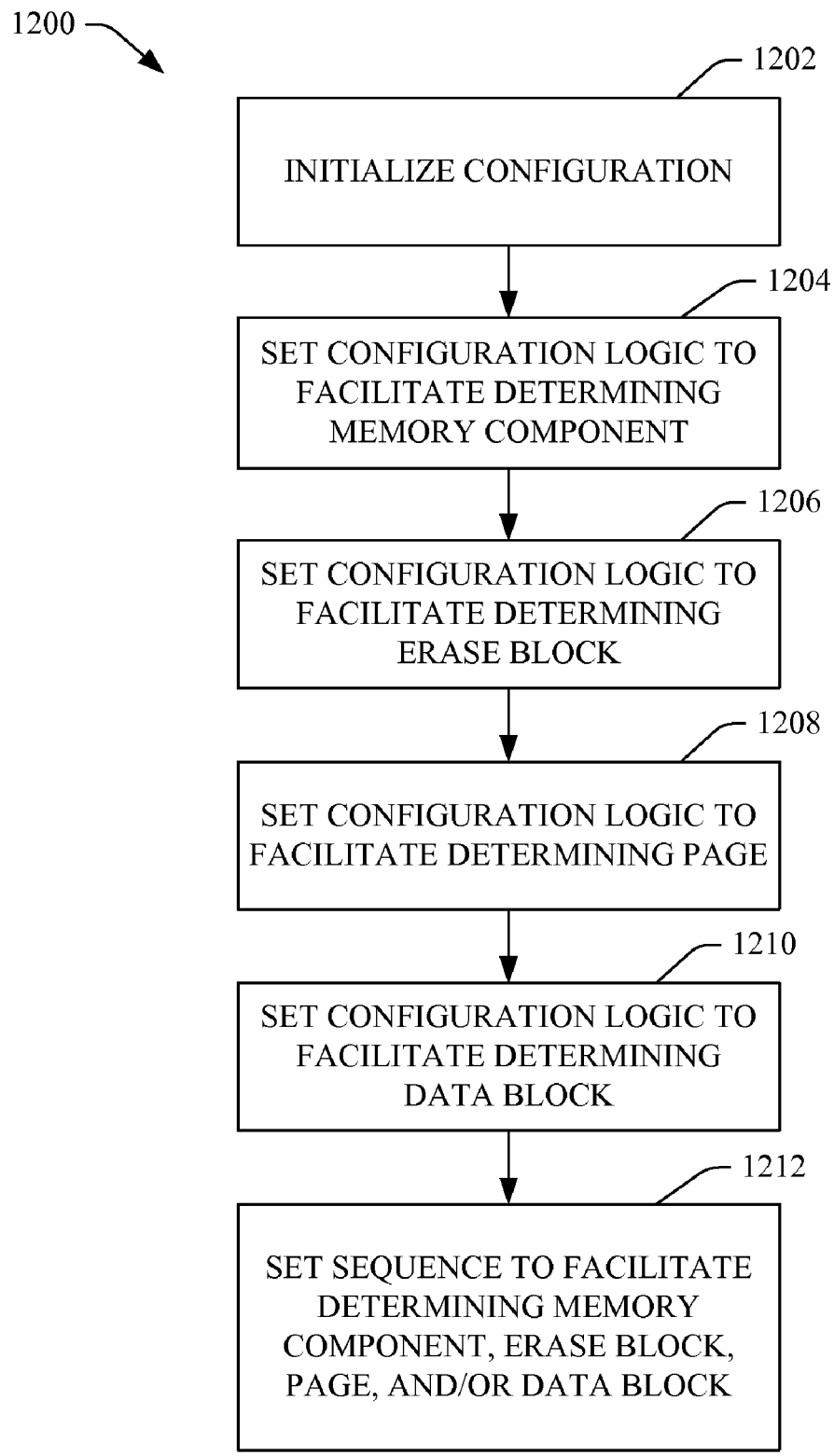
FIG. 12 illustrates a methodology that can facilitate configuring the sequence for performing LBA to PBA translations in accordance with an embodiment of the disclosed subject matter.

At 1104, an identification and/or location of a memory component (e.g., 104), an erase block, a page, and/or a data block associated with a desired LBA(s) can be determined based in part on the table look-up. In an aspect, the table look-up component and/or another component (e.g., controller component 108) can retrieve the desired translation attribute result from a table(s). The translation attribute result can be placed in a result register 304, where it can reside until a final result with regard to all desired translation attributes are received. When all desired translation attribute results are obtained, such results can be provided to the processor component, which can generate commands to facilitate accessing the desired memory location(s) in the identified memory component. At this point, methodology 1100 can end FIG. 12 illustrates a methodology 1200 that can facilitate configuring a sequence related to translation functions to facilitate LBA to PBA translations associated with a memory (ies) in accordance with an aspect of the disclosed subject matter. At 1202, a configuration can be initialized. In one aspect, a configuration can be initialized to facilitate setting a desired configuration sequence related to the performance of translation functions to facilitate performing LBA to PBA translations. For instance, a memory controller component (e.g., 102) can be initialized and configured so that translation functions (e.g., calculations, searches, table look-ups) can be performed in a desired order and/or respectively performed with regard to respective translation attributes, as desired. In an aspect, the configuration can be performed at the time of manufacture of the memory controller component and/or associated memory component(s) (e.g., 104). In another aspect, the initialization and configuration can be performed at another time(s), as desired. In yet another aspect, re-initialization of a memory controller component (e.g., memory controller component 102) and/or associated components also can be performed.

At 1204, configuration logic to facilitate determining a memory component associated with (e.g., containing) a desired LBA can be set. In one aspect, the configuration logic can be configured to facilitate performance one or more translation functions (e.g., calculation(s), search(es), and/or table look-up(s)) to facilitate determining and/or obtaining a desired translation result relating to the memory component (s) in which a desired LBA can be located. The memory controller component and/or associated components can be configured such that a translation function(s) can be selected to facilitate achieving a desired (e.g., optimal) performance of LBA to PBA translations based in part on predefined criteria. For example, if performing a calculation function to calculate the desired memory component associated with the desired LBA is determined to be the desired and/or most efficient method or technique for obtaining such translation attribute result, as compared to other translation functions (e.g., search, table look-up), the calculation function can be selected to facilitate obtaining the translation attribute result, and the configuration logic related to the associated translation attribute can be set so that the calculation function can be the translation function performed to determine the desired memory component associated with the LBA.

It is to be appreciated that, in one embodiment, where there is only one memory component, setting configuration logic to facilitate determining a memory component in which a LBA and associated PBA reside can be unnecessary, as there is only one memory component, and such configuration logic does not have to be set and/or a pass through value can be employed to facilitate bypassing performing a translation function related thereto.

At 1206, configuration logic to facilitate determining an erase block associated with (e.g., containing) a LBA can be set. In one aspect, the configuration logic can be configured to facilitate performance one or more translation functions (e.g., calculation(s), search(es), and/or table look-up(s)) to facilitate determining and/or obtaining a desired translation result relating to the memory component(s) in which a desired LBA can be located. The translation function(s) can be selected based in part on predefined criteria related to obtaining a desired (e.g., optimal) performance of LBA to PBA translations. The memory controller component and/or other components can be set so that the desired translation function(s) can be performed to determine (e.g., identify, locate) the erase block associated with the desired LBA.

At 1208, configuration logic to facilitate determining a page associated with a LBA can be set. In accordance with an aspect, the configuration logic can be configured to facilitate performance one or more translation functions to facilitate determining and/or obtaining information relating to the page in which a desired LBA can be located and/or accessed. The translation function(s) can be selected based in part on predefined criteria related to obtaining a desired (e.g., optimal) performance of LBA to PBA translations. The memory controller component and/or other components can be set so that the desired translation function(s) can be performed to determine (e.g., identify, locate) the page associated with the desired LBA.

At 1210, configuration logic to facilitate determining a data block associated with a LBA can be set. In accordance with an aspect, the configuration logic can be configured to facilitate performance one or more translation functions to facilitate determining and/or obtaining information relating to the data block in which a desired LBA can be located and/or accessed. The translation function(s) can be selected based in part on predefined criteria related to obtaining a desired (e.g., optimal) performance of LBA to PBA translations. The memory controller component and/or other components can be set so that the desired translation function(s) can be performed to determine (e.g., identify, locate) the data block associated with the desired LBA.

At 1212, the configuration sequence can be set based in part on a predefined criteria. The predefined criteria can relate to obtaining a desired (e.g., optimal) level of performance with regard to LBA to PBA translations, and respective portions (e.g., determining an erase block, determining a page, etc.) thereof. The memory controller component and/or other components can be configured in accordance with the configuration sequence. In an aspect, the respective translation functions to determine (e.g., identifying, locating) the memory component, erase block, page, and/or data block can be ordered (e.g., sequenced) so that respective translation functions can be performed serially, in parallel, or in some combination thereof, as desired. In another aspect, the translation attribute result related to one translation attribute can be used as input to facilitate determining a disparate translation attribute result associated with another translation attribute.

It is to be appreciated that, in accordance with an aspect, the configuration sequence can be re-configured, as desired. For example, it can be determined (e.g., based in part on information from an intelligent component 502 and/or predefined criteria) that the configuration sequence should be re-configured to a new configuration sequence that can facilitate providing improved results as compared to the current configuration sequence. The configuration sequence can be modified to create a new configuration sequence in accordance with methodology 1200. At this point, methodology 1200 can end.

Figure 13:
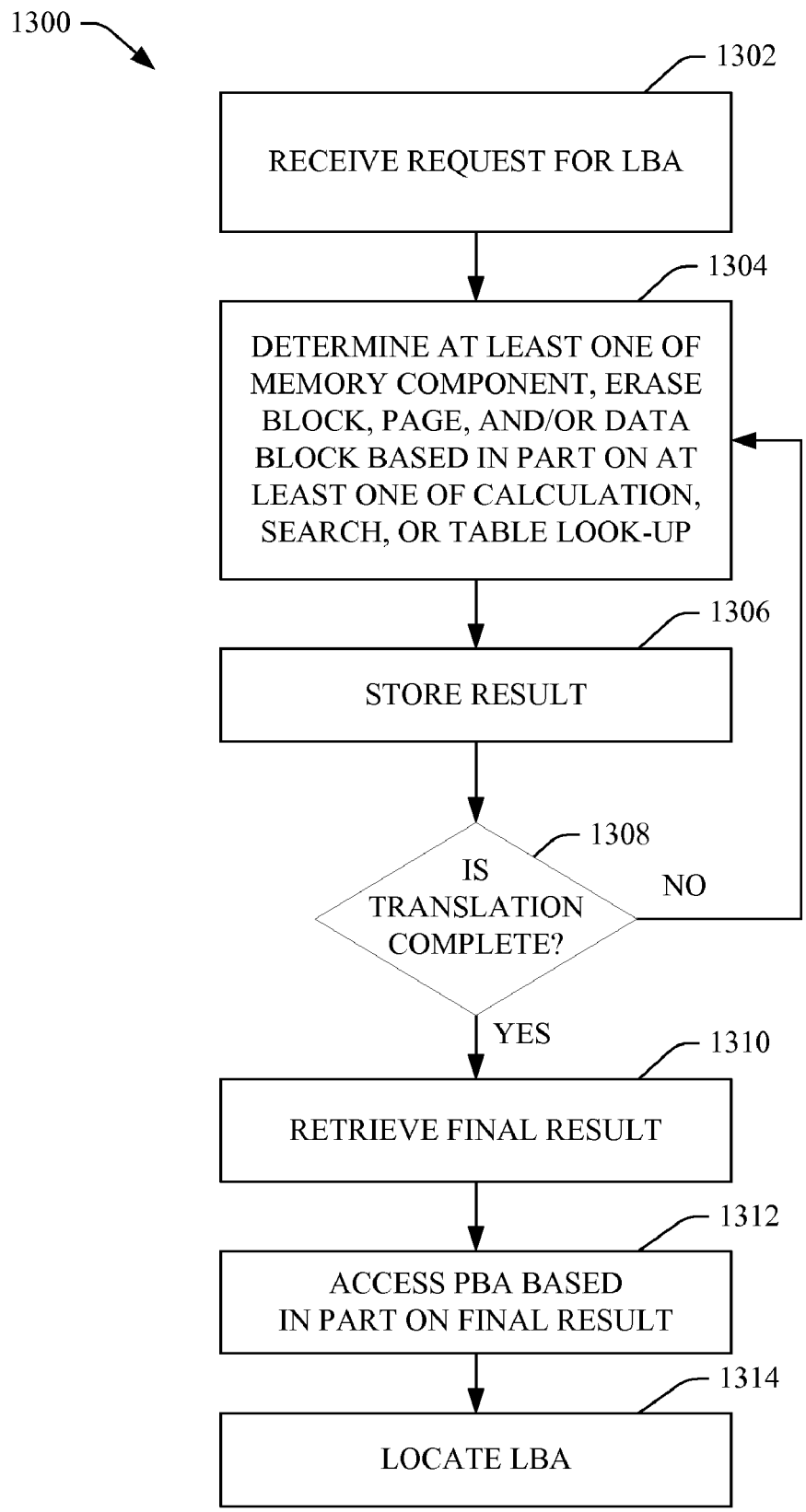
FIG. 13 depicts a methodology that can facilitate LBA to PBA translations in accordance with an aspect of the disclosed subject matter.

FIG. 13 depicts a methodology 1300 that can facilitate LBA to PBA translations associated with a memory(ies) in accordance with an aspect of the disclosed subject matter. At 1302, a request for a LBA can be received. In an aspect, one or more requests for respective LBAs can be generated by a processor component (e.g., 504). At 1304, a location and/or identification of at least one of a memory component, an erase block, a page, and/or a data block (e.g., a translation attribute) can be determined based in part on at least one of a calculation (s), a search(es), and/or a table look-up(s) (e.g., translation function). In one aspect, the type(s) and/or sequence of the performance of the translation functions with respect to the translation attributes can be determined based in part on a predetermined optimization criteria, which can relate to improving (e.g., optimizing) the performance of LBA to PBA searches and/or overall performance of the memory component (e.g., 104 and/or memory controller component (e.g., 102), for instance. In an aspect, a memory controller component 102 can be configured such that the translation functions can be selected and applied (e.g., performed) based in part on the configuration sequence.

At 1306, a result(s) (e.g., translation attribute result(s)) can be stored. In an aspect, a result register 304 can store the translation attribute result(s), or partial results, received as a result of the performance of one or more translation functions. At 1308, a decision can be made regarding whether the LBA to PBA translation is complete. In an aspect, a complete translation can include translation attribute results related to an identification and/or location of a memory component, an erase block, a page, and/or a data block, associated with a LBA(s). A memory controller component can facilitate managing the LBA to PBA translation and can facilitate determining whether such translation is complete. If it is determined that the translation is not complete, methodology 1300 can return to reference numeral 1304, where additional translation attribute results can be obtained and/or determined, and methodology 1300 can continue to proceed from that point.

If, at 1308, it is determined that the translation is complete, at 1310, the final result can be retrieved. In an aspect, the final result can be stored in a result register (e.g., 304) and can be retrieved from that result register and provided (e.g., transmitted) to another component, such as a processor component, to facilitate accessing the desired memory location(s) (e.g., PBA(s) that contains the desired LBA(s)) in the desired memory component. At 1312, a PBA(s) can be accessed based in part on the final result. At 1314, the LBA can be located. In one aspect, the desired LBA associated with the request (e.g., command) can be located, accessed, and/or retrieved based in part on the final result. In one aspect, a command(s) can be generated by a processor component to access the PBA(s) associated with the LBA, and one or more operations (e.g., read, write, erase) can be performed with respect to the LBA and/or data associated therewith. At this point, methodology 1300 can end.

Figure 14:
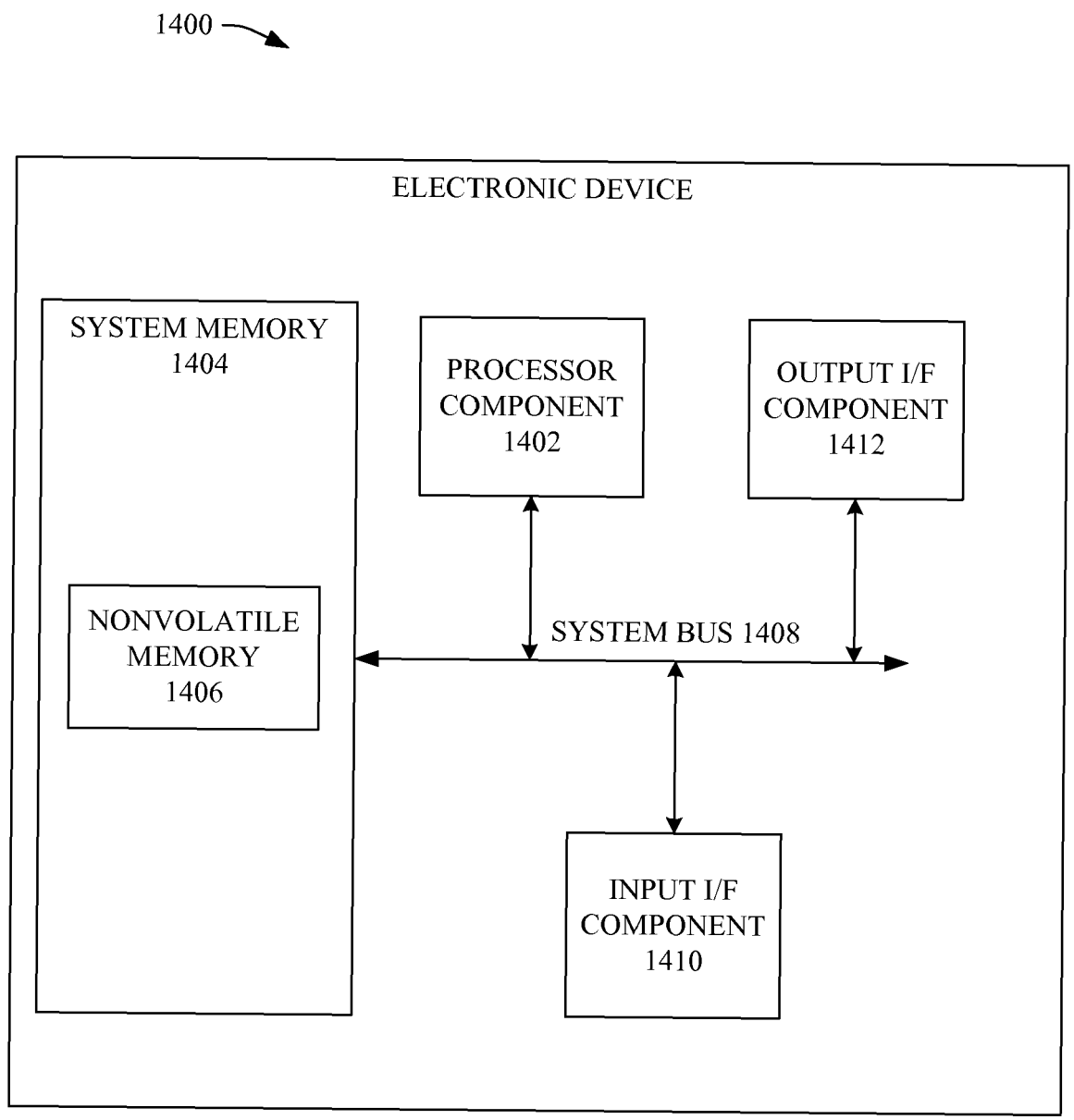
FIG. 14 illustrates an example of an electronic device that can be associated with a memory in accordance with an aspect of the disclosed subject matter.

Referring to FIG. 14, illustrated is a block diagram of an exemplary, non-limiting electronic device 1400 that can comprise and/or incorporate systems and methodologies as described herein (e.g., system 100, system 200, system 300, etc.), or a respective portion(s) thereof. The electronic device 1400 can include, but is not limited to, a computer, a laptop computer, network equipment (e.g., routers, access points), a media player and/or recorder (e.g., audio player and/or recorder, video player and/or recorder), a television, a smart card, a phone, a cellular phone, a smart phone, an electronic organizer, a PDA, a portable email reader, a digital camera, an electronic game (e.g., video game), an electronic device associated with digital rights management, a Personal Computer Memory Card International Association (PCMCIA) card, a trusted platform module (TPM), a Hardware Security Module (HSM), set-top boxes, a digital video recorder, a gaming console, a navigation system or device (e.g., global position satellite (GPS) system), a secure memory device with computational capabilities, a device with a tamper-resistant chip (s), an electronic device associated with an industrial control system, an embedded computer in a machine (e.g., an airplane, a copier, a motor vehicle, a microwave oven), and the like.

Components of the electronic device 1400 can include, but are not limited to, a processor component 1402, a system memory 1404, which can contain a nonvolatile memory 1406, and a system bus 1408 that can couple various system components including the system memory 1404 to the processor component 1402. The system bus 1408 can be any of several types of bus structures including a memory bus or memory controller, a peripheral bus, or a local bus using any of a variety of bus architectures.

Electronic device 1400 can typically include a variety of computer readable media. Computer readable media can be any available media that can be accessed by the electronic device 1400. By way of example, and not limitation, computer readable media can comprise computer storage media and communication media. Computer storage media includes volatile and non-volatile, removable and non-removable media implemented in any method or technology for storage of information such as computer readable instructions, data structures, program modules or other data. Computer storage media includes, but is not limited to, RAM, ROM, EEPROM, nonvolatile memory 1406 (e.g., flash memory), or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by electronic device 1400. Communication media typically embodies computer readable instructions, data structures, program modules or other data in a modulated data signal such as a carrier wave or other transport mechanism and includes any information delivery media.

The system memory 1404 can include computer storage media in the form of volatile (e.g., SRAM) (not shown) and/or nonvolatile memory 1406 (e.g., flash memory). In accordance with one embodiment of the disclosed subject matter, the system memory 1404, or a portion thereof, can comprise, and/or can be the same or substantially similar to, and/or can comprise the same or substantially similar functionality as, the memory component 104 (e.g., as illustrated in FIGS. 1, 2, etc., and described herein). A basic input/output system (BIOS), containing the basic routines that can facilitate transferring information between elements within electronic device 1400, such as during start-up, can be stored in the system memory 1404. The system memory 1404 typically also can contain data and/or program modules that can be accessible to and/or presently be operated on by the processor component 1402. By way of example, and not limitation, the system memory 1404 can also include an operating system (s), application programs, other program modules, and program data.

The nonvolatile memory 1406 can be removable or non-removable. For example, the nonvolatile memory 1406 can be in the form of a removable memory card or a USB flash memory drive. In accordance with one aspect, the nonvolatile memory 1406 can include flash memory (e.g., single-bit flash memory, multi-bit flash memory), ROM, PROM, EPROM, EEPROM, or NVRAM (e.g., FeRAM), or a combination thereof, for example. Further, a flash memory can comprise NOR flash memory and/or NAND flash memory.

A user can enter commands and information into the electronic device 1400 through input devices (not shown) such as a keypad, microphone, tablet, or touch screen although other input devices can also be utilized. These and other input devices can be connected to the processor component 1402 through input interface component 1410 that can be connected to the system bus 1408. Other interface and bus structures, such as a parallel port, game port or a universal serial bus (USB) can also be utilized. A graphics subsystem (not shown) can also be connected to the system bus 1408. A display device (not shown) can be also connected to the system bus 1408 via an interface, such as output interface component 1412, which can in turn communicate with video memory. In addition to a display, the electronic device 1400 can also include other peripheral output devices such as speakers (not shown), which can be connected through output interface component 1412.

It is to be understood and appreciated that the computer-implemented programs and software can be implemented within a standard computer architecture. While some aspects of the disclosure have been described above in the general context of computer-executable instructions that may run on one or more computers, those skilled in the art will recognize that the technology also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices (e.g., PDA, phone, watch), microprocessor-based or programmable consumer electronics, and the like, each of which can be operatively coupled to one or more associated devices.

The illustrated aspects of the disclosure may also be practiced in distributed computing environments where certain tasks are performed by remote processing devices that are linked through a communications network. In a distributed computing environment, program modules can be located in both local and remote memory storage devices.

As utilized herein, terms "component," "system," "interface," and the like, can refer to a computer-related entity, either hardware, software (e.g., in execution), and/or firmware. For example, a component can be a process running on a processor, a processor, an object, an executable, a program, and/or a computer. By way of illustration, both an application running on a server and the server can be a component. One or more components can reside within a process and a component can be localized on one computer and/or distributed between two or more computers.

Furthermore, the disclosed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the disclosed subject matter.

Some portions of the detailed description have been presented in terms of algorithms and/or symbolic representations of operations on data bits within a computer memory. These algorithmic descriptions and/or representations are the means employed by those cognizant in the art to most effectively convey the substance of their work to others equally skilled. An algorithm is here, generally, conceived to be a self-consistent sequence of acts leading to a desired result. The acts are those desiring physical manipulations of physical quantities. Typically, though not necessarily, these quantities take the form of electrical and/or magnetic signals capable of being stored, transferred, combined, compared, and/or otherwise manipulated.

It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the foregoing discussion, it is appreciated that throughout the disclosed subject matter, discussions utilizing terms such as processing, computing, calculating, determining, and/or displaying, and the like, refer to the action and processes of computer systems, and/or similar consumer and/or industrial electronic devices and/or machines, that manipulate and/or transform data represented as physical (electrical and/or electronic) quantities within the computer's and/or machine's registers and memories into other data similarly represented as physical quantities within the machine and/or computer system memories or registers or other such information storage, transmission and/or display devices.

What has been described above includes examples of aspects of the disclosed subject matter. It is, of course, not possible to describe every conceivable combination of components or methodologies for purposes of describing the disclosed subject matter, but one of ordinary skill in the art may recognize that many further combinations and permutations of the disclosed subject matter are possible. Accordingly, the disclosed subject matter is intended to embrace all such alterations, modifications and variations that fall within the spirit and scope of the appended claims. Furthermore, to the extent that the terms "includes," "has," or "having," or variations thereof, are used in either the detailed description or the claims, such terms are intended to be inclusive in a manner similar to the term "comprising" as "comprising" is interpreted when employed as a transitional word in a claim.

What is claimed is:

1. A system that facilitates access of at least one memory, comprising:
the at least one memory that is configured to include a plurality of memory locations; and
a memory controller component that is configured to generate and execute a configuration sequence, comprising at least two configuration sequence portions, in a specified order to facilitate performance of a logical block address to physical block address translation associated with the at least one memory based at least in part on the configuration sequence, wherein the configuration sequence is configured to comprise at least a first configuration sequence portion to facilitate performance of a first translation function of a plurality of available translation functions and a second configuration sequence portion to facilitate performance of a second translation function of the plurality of available translation functions, wherein the available translation functions comprise at least two of a calculation function, a table look-up function, or a search function, and wherein one of the calculation function, the table look-up function, or the search function is selected as the first translation function based at least in part on its higher efficiency in determination of a first translation attribute, which relates to the logical block address to physical block address translation, relative to efficiency of other of the available translation functions not selected as the first translation function.

2. The system of claim 1, the logical block address to physical block address translations translation comprises identification of at least one of a memory component, an erase block, a page, or a data block, wherein a physical block address is located based at least in part on information associated with the logical block address.

3. The system of claim 1, further comprising:
a calculator component that is configured to perform one or more calculations to facilitate a determination of at least one of a plurality of translation attributes, comprising identification of at least one of a memory component, an erase block, a page, or a data block, associated with a physical block address;
a table look-up component that is configured to access at least one table to retrieve information associated with at least another one of the plurality of translation attributes to facilitate determination of the at least another one of the plurality of translation attributes; and
a search component that is configured to search at least a subset of the plurality of memory locations to facilitate determination of at least a third one of the plurality of translation attributes, wherein the at least one, the at least another one, and the at least the third one of the plurality of translation attributes are respectively determined in accordance with the specified order of the configuration sequence.

4. The system of claim 3, the memory controller component is configured to utilize a translation attribute result associated with at least one of the at least one of the plurality of translation attributes, the at least another one of the plurality of translation attributes, or the at least the third one of the plurality of translation attributes to facilitate a determination of another of the at least one of the plurality of translation attributes, the at least another one of the plurality of translation attributes, or the at least the third one of the plurality of translation attributes, wherein scope of performance of a translation function to determine the another of the at least one of the plurality of translation attributes, the at least another one of the plurality of translation attributes, or the at least the third one of the plurality of translation attributes, is narrowed based at least in part on the translation attribute result.

5. The system of claim 1, wherein the first translation function is selected to be employed in the first configuration sequence portion, and the second translation function is selected to be employed in the second configuration sequence portion, respectively, over other translation functions in the plurality of available translation functions, based at least in part on the first translation function being more efficient than the other available translation functions in determination of a first translation attribute and the second translation function being more efficient than the other available translation functions in determination of the second translation attribute.

6. The system of claim 1, the configuration sequence is configured to facilitate management of at least one of a respective translation function to be performed to determine a respective translation attribute or an order in which respective translation functions are performed to determine respective translation attributes.

7. The system of claim 1, further comprising an intelligent component that is configured to render at least one inference related to the configuration sequence to facilitate generation of a new configuration sequence.

8. The system of claim 1, further comprising at least one controller component that is associated with the at least one memory, the at least one controller component is configured to facilitate performance of translation functions associated with the logical block address to physical block address translation.

9. The system of claim 8, the at least one controller component is configured to generate and provide an error message if there is an error associated with the performance of a translation function.

10. The system of claim 1, further comprising an initialization component that is configured to facilitate initialization of a configuration of at least one of the memory controller component or the at least one memory, and facilitates initialization of translation functions associated with the logical block address to physical block address translation.

11. An electronic device comprising the system of claim 1.

12. The electronic device of claim 11, wherein the electronic device is one of a computer, a cellular phone, a digital phone, a video device, a smart card, a personal digital assistant, a television, an electronic game, a digital camera, an electronic organizer, an audio player, an audio recorder, an electronic device associated with digital rights management, a Personal Computer Memory Card International Association (PCMCIA) card, a trusted platform module (TPM), an electronic control unit associated with motor vehicles, a global positioning satellite (GPS) unit, an electronic device associated with an airplane, an electronic device associated with an industrial control system, a Hardware Security Module (HSM), a set-top box, a secure memory device with computational capabilities, or an electronic device with at least one tamper-resistant chip.

13. A method that facilitates physical block address to logical block address translations associated with at least one memory, comprising:
    performing at least two translation functions in a specified order to facilitate determining a location of a physical block address associated with a logical block address in the at least one memory based at least in part on a configuration sequence, wherein the configuration sequence comprises at least a first configuration sequence portion to facilitate performance of a first translation function selected from a plurality of available translation functions and a second configuration sequence portion to facilitate performance of a second translation function of the plurality of available translation functions, wherein the available translation functions comprise at least two of a calculation function, a table look-up function, or a search function, and wherein one of the calculation function, the table look-up function, or the search function is selected as the first translation function based at least in part on the selected first translation function having a higher efficiency in determination of a first translation attribute, which relates to the logical block address to physical block address translation, relative to efficiency of other of the available translation functions not selected as the first translation function; and
    locating the physical block address based at least in part on the logical block address.

14. The method of claim 13, wherein the performing the at least two translation functions further comprises:
    performing at least one calculation to facilitate determining a location of at least one of a memory, an erase block, a page, or a data block, associated with the physical block address that is associated with the logical block address; and
    determining the location of the at least one of a memory, an erase block, a page, or a data block, based at least in part on at least one result associated with the performance of the at least one calculation.

15. The method of claim 13, wherein the performing the at least two translation functions further comprises:
    performing at least one table look-up to facilitate determining a location of at least one of a memory, an erase block, a page, or a data block, associated with the physical block address that is associated with the logical block address; and
    determining the location of the at least one of a memory, an erase block, a page, or a data block, based at least in part on at least one result associated with the performance of the at least one table look-up.

16. The method of claim 13, wherein the performing the at least two translation functions further comprises:
    performing at least one search of the at least one memory to facilitate determining a location of at least one of a memory, an erase block, a page, or a data block, associated with the physical block address that is associated with the logical block address; and
    determining the location of the at least one of a memory, an erase block, a page, or a data block, based at least in part on at least one result associated with the performance of the at least one search.

17. The method of claim 13, further comprising:
    initializing a configuration;
    generating a configuration sequence based at least in part on predetermined optimization criteria;
    setting configuration logic to facilitate determining an identification of a memory associated with the logical block address;
    setting configuration logic to facilitate determining an identification of an erase block associated with the logical block address;
    setting configuration logic to facilitate determining an identification of a page associated with the logical block address;
    setting configuration logic to facilitate determining an identification of a data block associated with the logical block address; and
    executing the configuration sequence.

18. The method of claim 13, further comprising:
    receiving a request associated with a logical block address;

determining at least one translation attribute result associated with at least one attribute associated with the logical block address, the at least one attribute is at least one of a memory, an erase block, a page, or a data block;

storing at least one translation attribute result;

retrieving a final result based at least in part the at least one translation attribute result;

accessing a physical block address that is associated with the logical block address based at least in part on the final result; and locating the logical block address or data associated with the logical block address.

19. The method of claim 13, further comprising:
providing an error message if there is an error associated with performing the at least one of the at least two translation functions.

20. The method of claim 13, wherein the performing the at least two translation functions further comprises:
performing the at least two translation functions in parallel.

* * * * *